United States Patent
Vaswani et al.

(10) Patent No.: US 11,016,949 B2
(45) Date of Patent: May 25, 2021

(54) DATABASE SYSTEM

(71) Applicant: Microsoft Technology Licensing, LLC, Redmond, WA (US)

(72) Inventors: Kapil Vaswani, Cambridge (GB); Manuel Silverio Da Silva Costa, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 15/955,682

(22) Filed: Apr. 17, 2018

(65) Prior Publication Data

US 2019/0236168 A1 Aug. 1, 2019

(30) Foreign Application Priority Data

Feb. 1, 2018 (GB) ...................................... 1801676

(51) Int. Cl.
*G06F 16/00* (2019.01)
*G06F 16/21* (2019.01)
*G06F 9/46* (2006.01)
*G06F 21/62* (2013.01)
*G06F 16/22* (2019.01)
*G06F 16/23* (2019.01)
*G06F 16/2453* (2019.01)
*G06F 16/2455* (2019.01)
*G06F 21/53* (2013.01)
*G06F 9/455* (2018.01)

(52) U.S. Cl.
CPC ............. *G06F 16/21* (2019.01); *G06F 9/466* (2013.01); *G06F 16/2272* (2019.01); *G06F 16/2282* (2019.01); *G06F 16/2358* (2019.01); *G06F 16/2453* (2019.01); *G06F 16/2455* (2019.01); *G06F 21/53* (2013.01); *G06F 21/6218* (2013.01); *G06F 21/6227* (2013.01); *G06F 2009/45587* (2013.01)

(58) Field of Classification Search
CPC ........................................................ G06F 16/00
See application file for complete search history.

(56) References Cited

U.S. PATENT DOCUMENTS

| | | | |
|---|---|---|---|
| 9,584,517 B1 * | 2/2017 | Roth | G06F 21/6209 |
| 9,678,687 B2 | 6/2017 | Woodward et al. | |
| 9,716,710 B2 | 7/2017 | Vij et al. | |
| 2008/0222159 A1 * | 9/2008 | Aranha | G06F 16/21 |
| 2016/0283731 A1 * | 9/2016 | Chow | G06F 16/22 |
| 2017/0177417 A1 | 6/2017 | Herbert et al. | |
| 2018/0006820 A1 | 1/2018 | Arasu et al. | |

(Continued)

OTHER PUBLICATIONS

"Enclave—Container Orchestration for Regulated Industries", Retrieved from: <<https://www.aptible.com/enclave/>>, Retrieved on: Jan. 17, 2018, 17 Pages.

(Continued)

*Primary Examiner* — Khanh B Pham

(57) ABSTRACT

In various examples, there is a database system which comprises an operating system, a query engine, a transaction manager and components implementing database administration functionality. The query engine and the transaction manager are configured to be executed within one or more memory enclaves of a host computer system separately from the operating system and the components implementing database administration functionality.

20 Claims, 9 Drawing Sheets

(56) References Cited

U.S. PATENT DOCUMENTS

| | | | | |
|---|---|---|---|---|
| 2018/0096143 | A1* | 4/2018 | Xiaoning | G06F 21/53 |
| 2018/0139053 | A1* | 5/2018 | Kadam | H04L 9/3247 |
| 2018/0322168 | A1* | 11/2018 | Levine | G06F 16/2448 |
| 2019/0034617 | A1* | 1/2019 | Scarlata | G06F 9/3016 |
| 2019/0058696 | A1* | 2/2019 | Bowman | H04L 9/0822 |

OTHER PUBLICATIONS

"Intel® Software Guard Extensions Programming Reference", Retrieved from: <<https://software.intel.com/sites/default/files/managed/48/88/329298-002.pdf>>, Oct. 2014, 186 Pages.

"Telecom Application Transaction Processing Benchmark", Retrieved from: <<http://tatpbenchmark.sourceforge.net/>> Jul. 2011, 2 Page.

"TPC-C", Retrieved from: <<http://www.tpc.org/tpcd>>, 2001, 1 Page.

Amanatidis, et al, "New Security Models and Provably-Secure Schemes for Basic Query Support in Outsourced Databases", In Proceedings of the International Symposium on Cryptography, 2007, pp. 1-19.

Arasu, et al, "Orthogonal Security with Cipherbase", In Proceedings of 6th Biennial Conference on Innovative Data Systems Research, Jan. 6, 2013, 10 Pages.

Arasu, et al, "Secure Database-as-a-service with Cipherbase", In Proceedings of the ACM SIGMOD International Conference on Management of Data, Jun. 22, 2013, pp. 1033-1036.

Arnautov, et al, "SCONE: Secure Linux Containers with Intel SGX", In Proceedings of the 12th USENIX Conference on Operating Systems Design and Implementation, Nov. 2, 2016, pp. 689-703.

Bajaj, et al, "TrustedDB: A Trusted Hardware Based Database with Privacy and Data Confidentiality", In Proceedings of the ACM SIGMOD International Conference on Management of Data, Jun. 12, 2011, pp. 205-216.

Baumann, et al, "Shielding Applications from an Untrusted Cloud with Haven", In Journal of ACM Transactions on Computer Systems, vol. 33, Issue 3, Aug. 2015, 26 Pages.

Bellare, et al, "Deterministic and Efficiently Searchable Encryption", In Proceedings of the International Symposium on Cryptography, Aug. 2007, pp. 1-43.

Bouganim, et al, "Chip-Secured Data Access: Confidential Data on Untrusted Servers", In Proceedings of the 28th International Conference on Very Large Data Bases, Aug. 20, 2002, 12 Pages.

Brasser, et al, "Software Grand Exposure: SGX Cache Attacks Are Practical", In Proceedings of the Computing Research Repository, Feb. 2017, pp. 1-17.

Checkoway, et al, "Iago Attacks: Why the System Call API is a Bad Untrusted RPC Interface", In Proceedings of the Eighteenth International Conference on Architectural Support for Programming Languages and Operating Systems, Mar. 16, 2013, pp. 253-263.

Chen, et al, "Detecting Privileged Side-Channel Attacks in Shielded Execution with Déjà Vu", In Proceedings of the ACM on Asia Conference on Computer and Communications Security, Apr. 2, 2017, pp. 7-18.

Cheng, et al, "Protecting In-memory Data Cache with Secure Enclaves in Untrusted Cloud", In Proceedings of International Symposium on Cyberspace Safety and Security, Oct. 21, 2017, 8 Pages.

Diaconu, et al, "Hekaton: SQL Server's Memory-Optimized OLTP engine", In Proceedings of the ACM SIGMOD International Conference on Management of Data, Jun. 22, 2013, pp. 1243-1254.

Durak, et al, "What Else is Revealed by Order-Revealing Encryption?" ,In Proceedings of the ACM SIGSAC Conference on Computer and Communications Security, Oct. 24, 2016, pp. 1155-1166.

Fuhry, et al, "HardIDX: Practical and Secure Index with SGX", In Proceedings of 31st Annual Conference on Data and Applications Security and Privacy, Jul. 19, 2017, pp. 1-20.

Gentry, Craig, "Fully Homomorphic Encryption Using Ideal Lattices", In Proceedings of the Forty-First Annual ACM Symposium on Theory of Computing, May 31, 2009, pp. 169-178.

Gentry, et al, "Homomorphic Evaluation of the AES Circuit", In Proceedings of the 32nd Annual Cryptology Conference on Advances in Cryptology, Aug. 19, 2012, pp. 850-867.

Gribov, et al, "StealthDB: a Scalable Encrypted Database with Full SQL Query Support", In Journal of Computing Research Repository, Nov. 7, 2017, pp. 1-18.

Grubbs, et al, "Leakage-Abuse Attacks Against Order-Revealing Encryption", In Proceedings of the IEEE Symposium on Security and Privacy, May 22, 2017, 18 Pages.

Hacigümüş, et al, "Executing SQL over Encrypted Data in the Database-Service-Provider Model", In Proceedings of the ACM SIGMOD International Conference on Management of Data, Jun. 3, 2002, pp. 216-227.

Herlihy, et al, "Linearizability: A Correctness Condition for Concurrent Objects", In Journal of ACM Transactions on rogramming Languages and Systems, vol. 12, Issue 3, Jul. 1990, pp. 463-492.

Lind, et al, "Glamdring: Automatic Application Partitioning for Intel SGX", In Proceedings of USENIX Annual Technical Conference, Jul. 12, 2017, 15 Pages.

Macauley, et al, "Always Encrypted (Database Engine)", Retrieved from: <<https://msdn.microsoft.com/en-us/library/mt163865.aspx>>, Apr. 24, 2017, 20 Pages.

Maheshwari, et al, "How to Build a Trusted Database System on Untrusted Storage", In Proceedings of the 4th Conference on Symposium on Operating System Design & Implementation, Oct. 22, 2000, 16 Pages.

Matetic, et al., "ROTE: Rollback Protection for Trusted Execution", In Proceedings of the 26th USENIX Security Symposium, Aug. 16, 2017, 19 Pages.

McGrew, et al, "The Galois/Counter mode of Operation (GCM)", In Publication of NIST Modes of Operation Process, Jan. 2004, 43 Pages.

McKeen, et al, "Innovative Instructions and Software Model for Isolated Execution", In Proceedings of the 2nd International Workshop on Hardware and Architectural Support for Security and Privacy, Jun. 23, 2013, pp. 1-8.

Merkle, Ralph Charles, "Secrecy, Authentication, and Public Key Systems", In Technical Report No. 1979-1, Jun. 1979, 193 Pages.

Mykletun, et al, "Incorporating a Secure Coprocessor in the Database-as-a-Service Model", In Proceedings of Innovative Architecture for Future Generation High-Performance Processors and Systems, Jan. 17, 2005, 7 Pages.

Naveed, et al, "Inference Attacks on Property-Preserving Encrypted Databases", In Proceedings of the 22nd ACM SIGSAC Conference on Computer and Communications Security, Oct. 12, 2015, pp. 644-655.

Ohrimenko, et al, "Oblivious Multi-Party Machine Learning on Trusted Processors", In Proceedings of 25th USENIX Security Symposium, Aug. 10, 2016, pp. 1-18.

Paillier, Pascal, "Public-Key Cryptosystems Based on Composite Degree Residuosity Classes", In Proceedings of the 17th International Conference on Theory and Application of Cryptographic Techniques, May 2, 1999, pp. 223-238.

Papadimitriou, et al., "Big Data Analytics over Encrypted Datasets with Seabed", In Proceedings of the 12th USENIX conference on Operating Systems Design and Implementation, Nov. 2, 2016, 17 Pages.

Pires, et al, "Secure Content-Based Routing Using Intel Software Guard Extensions", In Journal of Computing Research Repository, Jan. 17, 2017, 10 Pages.

Popa, et al, "CryptDB: Protecting Confidentiality with Encrypted Query Processing", In Proceedings of the Twenty-Third ACM Symposium on Operating Systems Principles, Oct. 23, 2011, pp. 85-100.

Porter, et al., "Rethinking the Library OS from the Top Down", In Proceedings of the Sixteenth International Conference on Architectural Support for Programming Languages and Operating Systems, Mar. 5, 2011, pp. 291-304.

(56) References Cited

OTHER PUBLICATIONS

"Google/encrypted-bigquery-client", Retrieved from: <<https://github.com/google/encrypted-bigquery-client>>, Retrieved on: Jan. 18, 2018, 2 Pages.

Schuster, et al, "VC3: Trustworthy Data Analytics in the Cloud Using SGX", In Proceedings of the IEEE Symposium on Security and Privacy, May 17, 2015, pp. 38-54.

Shamir, Adi, "How to Share a Secret", In Magazine of Communications of the ACM, vol. 22, Issue 11, Nov. 1979, pp. 612-613.

Shinde, et al, "Panoply: Low-TCB Linux Applications with SGX Enclaves", In Proceedings of 24th Annual Network and Distributed System Security Symposium, Feb. 1, 2017, pp. 1-15.

Shinde, et al, "Preventing Page Faults from Telling Your Secrets", In Proceedings of the 11th ACM on Asia Conference on Computer and Communications Security, May 30, 2016, pp. 317-328.

Sinha, et al, "A Design and Verification Methodology for Secure Isolated Regions", In Proceedings of the 37th ACM SIGPLAN Conference on Programming Language Design and Implementation, Jun. 13, 2016, pp. 665-681.

Smith, et al, "Practical Server Privacy with Secure Coprocessors", In IBM Systems Journal—End-to-end Security, vol. 40, Issue 3, Mar. 2001, pp. 683-695.

Strackx, et al, "Ariadne: A Minimal Approach to State Continuity", In Proceedings of the 25th USENIX Security Symposium, Aug. 10, 2016, 19 Pages.

Teschke, Fredrik, "kissdb-sgx", Retrieved from: <<https://github.com/ftes/kissdb-sgx>>, Retrieved Date: Jan. 17, 2018, 12 Pages.

Tsai, et al, "Graphene-SGX: A Practical Library OS for Unmodified Applications on SGX", In Proceedings of the USENIX Annual Technical Conference, Jul. 12, 2017, pp. 645-658.

"Microsoft Mechanics: Ask me anything, with Mark Russinovich on cloud, Sysinternals, security, and more",Youtube,, Retrieved from: https://www.youtube.com/watch?v=P1pk9VBdwUs, Sep. 27, 2017, 1 Page.

Atamli-Reineh, et al., "A framework for application partitioning using trusted execution environments: A framework for application partitioning using trusted execution environments", In Proceedings of the Concurrency and Computation: Practice and Experience vol. 29, Issue 23, Dec. 10, 2017, 23 Pages.

Brandenburger, et al., "Rollback and Forking Detection for Trusted Execution Environments using Lightweight Collective Memory", In Proceedings of the 47Th Annual IEEE/IFIP International Conference on Dependable Systems and Networks, Jun. 1, 2017, 12 Pages.

Priebe, et al., "EnclaveDB: A Secure Database Using SGX", In Proceedings of the IEEE Symposium on Security and Privacy, May 1, 2018, 15 Pages.

Aumasson, et al., "SGX Secure Enclaves in Practice", Retrieved from: https://www.blackhat.com/docs/us-16/materials/us-16-Aumasson-SGX-Secure-Enclaves-In-Practice-Security-And-Crypto-Review.pdf, Mar. 15, 2018, 65 Pages.

Kerschbaum, et al., "Building Secure (Cloud) Applications Using Intel S Sgx", Retrieved from: https://fps2017.loria.fr/wp-content/uploads/2017/10/kerschbaum.pdf, Oct. 1, 2017, 39 Pages.

Gabel, et al., "Secure Database Outsourcing to the Cloud: Side-Channels, Counter-Measures and Trusted Execution", In Proceedings of the IEEE 30th International Symposium on Computer-Based Medical Systems, Jun. 1, 2017, 6 Pages.

"International Search Report and Written Opinion Issued in PCT Application No. PCT/US2019/015046", dated Apr. 8, 2019, 13 Pages.

Russinovich, Mark, "Introducing Azure Confidential Computing", Retrieved from: https://azure.microsoft.com/en-in/blog/introducing-azure-confidential-computing/, Sep. 14, 2017, 6 Pages.

Tu, et al, "Processing Analytical Queries over Encrypted Data", In Proceedings of the 39th International Conference on Very Large Data Bases, vol. 6, Issue 5, Mar. 2013, pp. 289-300.

Xu, et al, "Controlled-Channel Attacks: Deterministic Side Channels for Untrusted Operating Systems", In Proceedings of the IEEE Symposium on Security and Privacy, May 17, 2015, pp. 640-656.

Zheng, et al, "Opaque: A Data Analytics Platform with Strong Security", In Proceedings of 14th USENIX Symposium on Networked Systems Design and Implementation, Mar. 27, 2017, pp. 283-298.

\* cited by examiner

DATABASE SYSTEM

CROSS-REFERENCE TO RELATED APPLICATION(S)

This non-provisional utility application claims priority to UK patent application number 1801676.6 entitled "DATABASE SYSTEM" and filed on Feb. 1, 2018, which is incorporated herein in its entirety by reference.

BACKGROUND

The technology generally relates to database systems and more specifically to database systems which serve to protect the confidentiality of data stored in the database system and the integrity of queries executed within the database system.

Database administrators typically have significant privileges to control and/or monitor the host computer system on which a database systems runs. This is necessary to allow the database administrators to carry out administrative tasks (or functions) on the databases within the database system. Other users may also have significant privileges over the database system and/or the host computer system, which may allow them to access data within the database or manipulate queries executed upon the database, affecting the integrity of the data provided to or received from the database. Some unauthorized third parties (commonly referred to as hackers) may also gain significant privileges over the database system and/or the host computer system, by exploiting bugs in the system software, operating system or hypervisor.

The data within some or all of the databases in a database system may be considered to be confidential and should only be accessible by the authorized users of that database, which might not include the database administrator or other authorized users with significant privileges over the database system and/or the host computer system (needless to say the same also holds true for unauthorized users). For example, a human resources (HR) database might include various personal data items, such as date of birth or salary, which are considered to be confidential and should only be accessible by authorized users, such as members of the HR department. Yet, given their significant privileges over the database system and/or host computer system, maintaining the confidentiality of that data from such other users is challenging. Such users may, for example, be able to access the data from on-disk storage to which it is persisted. Even where semantically secure encryption is used to protect the data at rest in on-disk storage, such data may still be susceptible to snooping by such users when it is operated on since this requires the data to be decrypted in memory.

Additionally, the accuracy of the data within some or all of the databases in a database system may be considered to be particularly important. For example, critical business decisions might be based on data stored within the database, such that inaccuracies in that data can have a significant impact on the business. However, given their significant privileges over the database system and/or host computer system, maintaining the integrity of the data that is stored in and retrieved from the database from such other users is challenging. Even if the confidentiality and integrity of individual items of data (or datum) can be assured, these users may still be able to affect the integrity of the database, by altering the results which are provided in response to queries on the database. For example, such users might attempt to tamper with the query itself to change the way in which the query is executed so as to skip certain items of data, thereby yielding inaccurate results.

In a cloud computing environment, users can make use of remote database systems to store and process their data. The physical location of the remote database system may not be known to the user of the database system. Furthermore, the user may not know or trust other users which may have access to the remote database system, including, for example, a database administrator of the third party running the cloud computing environment. The user may also have concerns about the possibility of unauthorized users gaining privileges on the remote database system. If a user cannot confidently determine that the data which they store in the remote database system is secure (with respect to the confidentiality and integrity of the data) from such other users, they may be dissuaded from using the cloud computing environment to store and/or process their data.

A Trusted Execution Environment (TEE), is a secure area of a processor which guarantees that code and data within the secure area is protected with respect to confidentiality and integrity. One technology which provides a TEE is the use of memory enclaves. As an example, an enclave may be created using Microsoft® Virtual Secure Mode (VSM). Alternatively, Intel® processors may include Software Guard Extensions (SGX) instructions which allow a secure enclave to be created. However, other mechanisms for creating enclaves can be used, such as AMD® Secure Encrypted Virtualization (SEV). The code and data for a particular process may be stored and/or processed within an enclave. Data and processing within the enclave is protected from other processes that may be being executed within the computer system, helping to ensure its confidentiality and integrity. Enclaves typically provide an enclave quoting mechanism which enables a user to verify that a process is actually operating inside a valid enclave and also the state of the enclave (e.g. the actual process that is within the enclave).

The embodiments described below are not limited to implementations which solve any or all of the disadvantages of known database systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples, there is a database system which comprises an operating system, a query engine, a transaction manager and components implementing database administration functionality. The query engine and the transaction manager are configured to be executed within one or more memory enclaves of a host computer system separately from the operating system and the components implementing database administration functionality.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
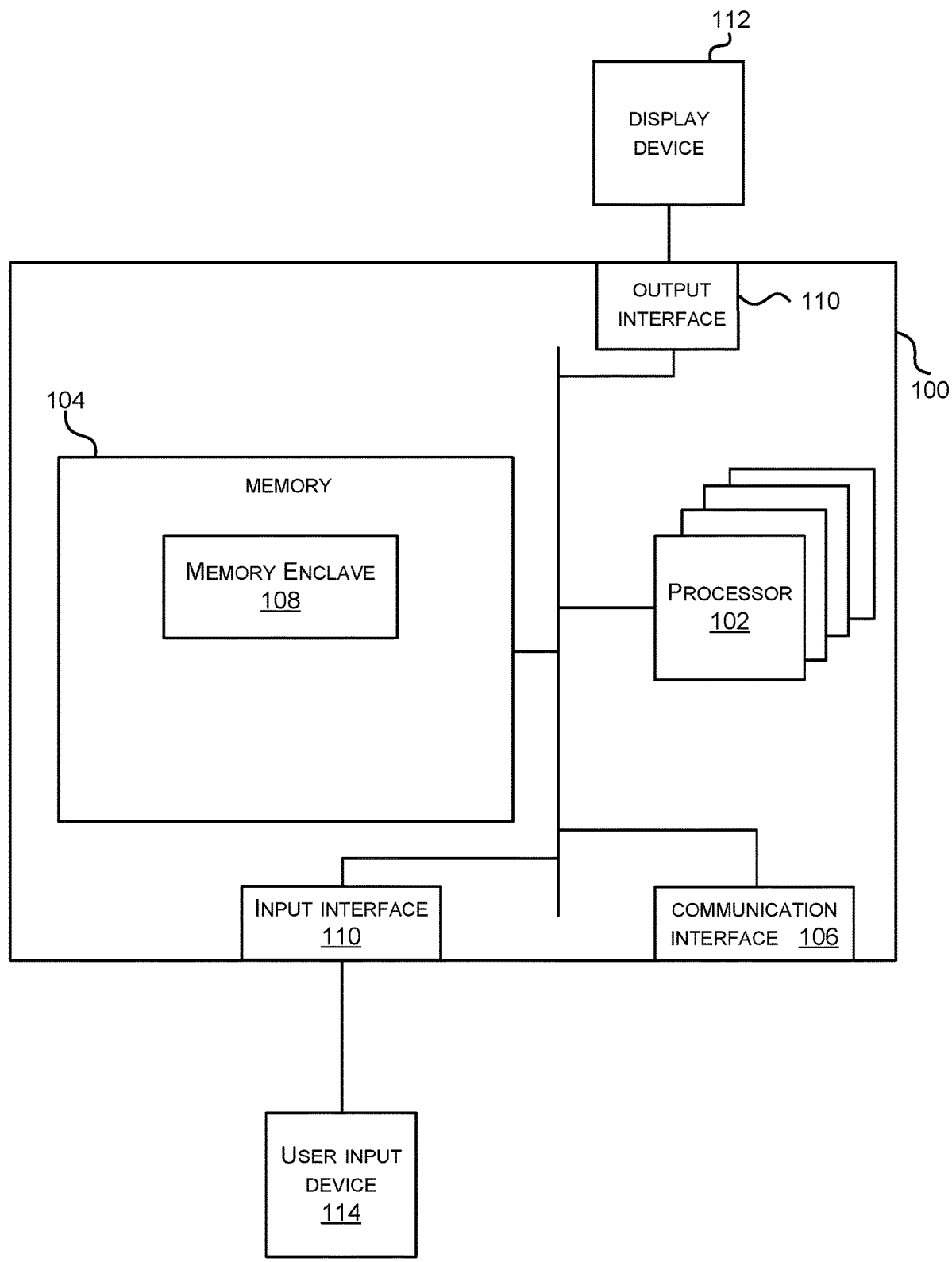
FIG. 1 illustrates an exemplary computing-based device in which embodiments of a database system are implemented.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In an example there is a database system comprising: an operating system, a query engine, a transaction manager and components implementing database administration functionality (130). The query engine and the transaction manager are configured to be executed within one or more memory enclaves of a host computer system separately from the operating system and the components implementing database administration functionality.

By executing the query engine and transaction manager in one or more memory enclaves of the host computer system, the data processed by the query engine and transaction manager are inaccessible to other processes running on the host computer system. Therefore, the confidentiality and integrity of the data processed by the query engine and the transaction manager is protected. By placing the entire query engine inside of the memory enclave, the query plan that the query engine uses to process a query is also protected from other processes running on the host computer system outside of the memory enclave. This prevents other the other processes on the host computer system from being able to alter the query plan and thereby ensures the integrity of the query that is performed by the query engine. Meanwhile, since the operating system and the components implementing database administration functionality are executed separately from the query engine and the transaction manager (i.e. outside of the enclave in which the query engine and transaction manager are executing), administrative users are able to carry out administrative tasks on the database system without being able to access the data processed by the query engine or otherwise tamper with the operations performed by the query engine. Similarly any unauthorized users which gain access to the system by exploiting bugs in the operating system (or other components of the database system which are processed outside of the enclave) will not be able to access or tamper with the processing performed by the query engine and the transaction manager of the database system.

This approach has an advantage over other approaches that could be adopted for protecting data using enclaves. For example, an alternative approach could be to attempt to place only small pieces of the query engine, such as just an execution engine (or expression evaluator), into the enclave. The remaining parts of the query engine, which actually build the query would then be executed outside of the enclave. However, this approach would not provide confidentiality for the queries, nor does it provide integrity for the results, since the parts of the query engine which parse and plan the execution of the query remain outside of the enclave such that they are visible to, and potentially controllable by, other processes running on the hast computer system. A different approach could be to attempt to place the entire database system inside the enclave. However, this approach leads to a large trusted computing base and increased performance overheads. Additionally, this approach would not provide protection from database administrators, since the database administration components would have access to the memory used by the query engine and transaction manager and would therefore be able to monitor and potentially tamper with their operation.

In another example there is a computer-implemented method for interacting with a database system. The method creates a secure connection to a memory enclave on the database system. The method requests an enclave quote from the memory enclave and verifies, using the enclave quote, that the processes running in the memory enclave include a query engine and a transaction manager of the database system, but do not include an operating system of the database system or components implementing database administration functionality for the database system. The method sends a request to the database system via the secure connection to execute a query.

By using the enclave quote to verify that the processes running in the memory enclave include the query engine and the transaction manager of the database system, but do not include the operating system of database administration components, the user knows that any queries they send to the database system will be processed by the query engine in such a way that they are protected from other processes running on the host computer system.

In-memory databases, such as provided by Microsoft® Hekaton engine store their data in tables and indexes in volatile memory. Whilst this can provide many advantages, such as improved performance, one drawback to in-memory databases is that the data stored in volatile memory is lost when the computer system that they are operating on is rebooted (such as due to power or component failure or as part of routine maintenance of the computer system). Therefore, such in-memory databases typically make use of a transaction log to allow recovery of a current state of the database following a reboot of the host computer system by replaying the transactions recorded in the log entries of the transaction log. Databases other than in-memory databases may also make use of a transaction log to allow recovery of a database's state in the event that the main storage for the database is somehow lost or corrupted (even if this doesn't ordinarily occur on a normal reboot of a host computer system).

Given that the state of the database following recovery from the transaction log (or just log) is determined by the transaction log entries that are read from the transaction log, it is desirable to provide a mechanism by which the integrity of the transaction log can be assured. Otherwise, a user with access (either authorized or unauthorized) to the transaction log can, either intentionally or accidentally, alter the log, thereby changing the state of the database system when it is restored from the log. Whilst mechanisms exist for verifying the integrity of individual log entries, such as by including a signed hash of the log entries contents in the log file, it is also desirable to ensure that the collection of log entries in the log is itself unchanged.

Merkle trees provide one possible solution for ensuring the integrity of the collection of log entries. Merkle trees are a tree data structure in which every leaf node is labelled with the hash of a data block and every non-leaf node is labelled with the cryptographic hash of the labels of its child nodes. However, maintaining a Merkle tree for highly concurrent and write-intensive workloads, such a database transaction log can be computationally intensive. This is because, when writing to a leaf node of a Merkle tree, each of the parent nodes also need to be updated. Therefore, when maintaining a transaction log using a Merkle tree, it is necessary for a process which is appending a log entry to the transaction log to obtain locks on a leaf node and each of its parent nodes. Since a database transaction log is an append-only workload and may make use of a large number of different transaction processing threads to process transactions simultaneously, a transaction log based on a Merkle tree can introduce significant contention and end up being a bottleneck in the database system. This is because each the transaction processing threads will be attempting to write to roughly the same set of nodes in the Merkle tree and will therefore end up competing with each other (and having to wait) to obtain the locks necessary to append a log entry to the transaction log.

In another example, there is a database system configured such that at least part of the database system is configured to be executed within a trusted execution environment, the database system comprising: a transaction logger configured to write transaction log entries to a transaction log stored outside of the trusted execution environment, each of the transaction log entries representing a transaction processed by the database system; a first secure counter configured to maintain a representation of the number of transaction log entries which have been written to the transaction log for transactions which have been committed to the database; and a restoration module configured to restore the database system based, at least in part, on transaction log entries retrieved from the transaction log and a current value of the first secure counter.

In another example, there is provided a computer-implemented method for writing transaction log entries to a transaction log for a database system, wherein at least part of the database system is configured to be executed within a trusted execution environment and the transaction log is stored outside of the trusted execution environment, the method comprising: maintaining a first secure count representing a number of transaction log entries which have been written to the transaction log for transactions which have been committed to the database; and writing a transaction log entry to the transaction log.

In another example, there is provided a computer-implemented method for restoring a database system, wherein at least a part of the database system is configured to be executed within a trusted execution environment, the method comprising: receiving one or more transaction log entries retrieved from a transaction log stored outside of the trusted execution environment, each of the one or more transaction log entries representing a transaction processed by the database system; and receiving a current value of a first secure count maintained by the database system, the first secure count representing the number of transaction log entries which have been written to the transaction log for transactions which have been committed to the database; verifying the integrity of the transaction log based, at least in part, on the current value of the first secure count by determining that a correct number of transaction log entries has been received; and in response to verifying the integrity of the received transaction log entries, restoring the database using the received transaction log entries and the current value of the first secure count.

By using a secure counter to track the number of transaction log entries which have been written to a transaction log for transactions which have been committed to the database, the database system is able to verify that the number of transaction log entries that it receives from the transaction log contains a sufficient number of transaction log entries. Since the secure counter is separate from the transaction log, both the counter and the transaction log would need to be changed in a manner such that they still correspond to one another in order for the database system to not be able to verify that at least the correct number of transaction log entries have been received.

Although the present examples are described and illustrated herein as being implemented in a computer system, the system described is provided as an example and not a limitation. As those skilled in the art will appreciate, the present examples are suitable for application in a variety of different types of computer systems.

FIG. 1 is a schematic diagram illustrating various components of an exemplary computing-based device 100 which are implemented as any form of a computing and/or electronic device, and in which embodiments of the database system are implemented in some examples.

Computing-based device 100 comprises one or more processors 102 which are microprocessors, controllers or any other suitable type of processors for processing computer executable instructions to control the operation of the device according to the embodiments of the database system or the method for interacting with the database system. In some examples, for example where a system on a chip architecture is used, the processors 102 include one or more fixed function blocks (also referred to as accelerators) which implement a part of the database system in hardware (rather than software or firmware). Platform software comprising an operating system or any other suitable platform software is provided at the computing-based device to enable the database system or the method of interacting with the database system to be executed on the device.

The computer executable instructions are provided using any computer-readable media that is accessible by computing based device 100. Computer-readable media includes, for example, computer storage media such as memory 104 and communications media. Computer storage media, such as memory 104, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 104) is shown within the computing-based device 100 it will be appreciated that the storage is, in some examples, distributed or located remotely and accessed via a network or other communication link (e.g. using communication interface 106).

The processor 102 supports the creation of a memory enclave 108 within the memory 104 of the computing based device 100. As an example, an enclave may be created using Microsoft® Virtual Secure Mode (VSM). Alternatively, Intel® processors may include Software Guard Extensions (SGX) instructions which allow a secure enclave to be created. However, other mechanisms for creating enclaves can be used, such as AMD® Secure Encrypted Virtualization (SEV)

The computing-based device 100 also comprises an input/output controller 110 arranged to output display information to a display device 112 which may be separate from or integral to the computing-based device 100. The display information may provide a graphical user interface. The input/output controller 110 is also arranged to receive and process input from one or more devices, such as a user input device 114 (e.g. a mouse, keyboard, camera, microphone or other sensor). Of course, in some examples, the computing-based device may operate as a headless server, without a permanently connected display device 112 or user input device 114. In this configuration, the computing-based device 100 may rely on communication interface 106 for all input/output.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
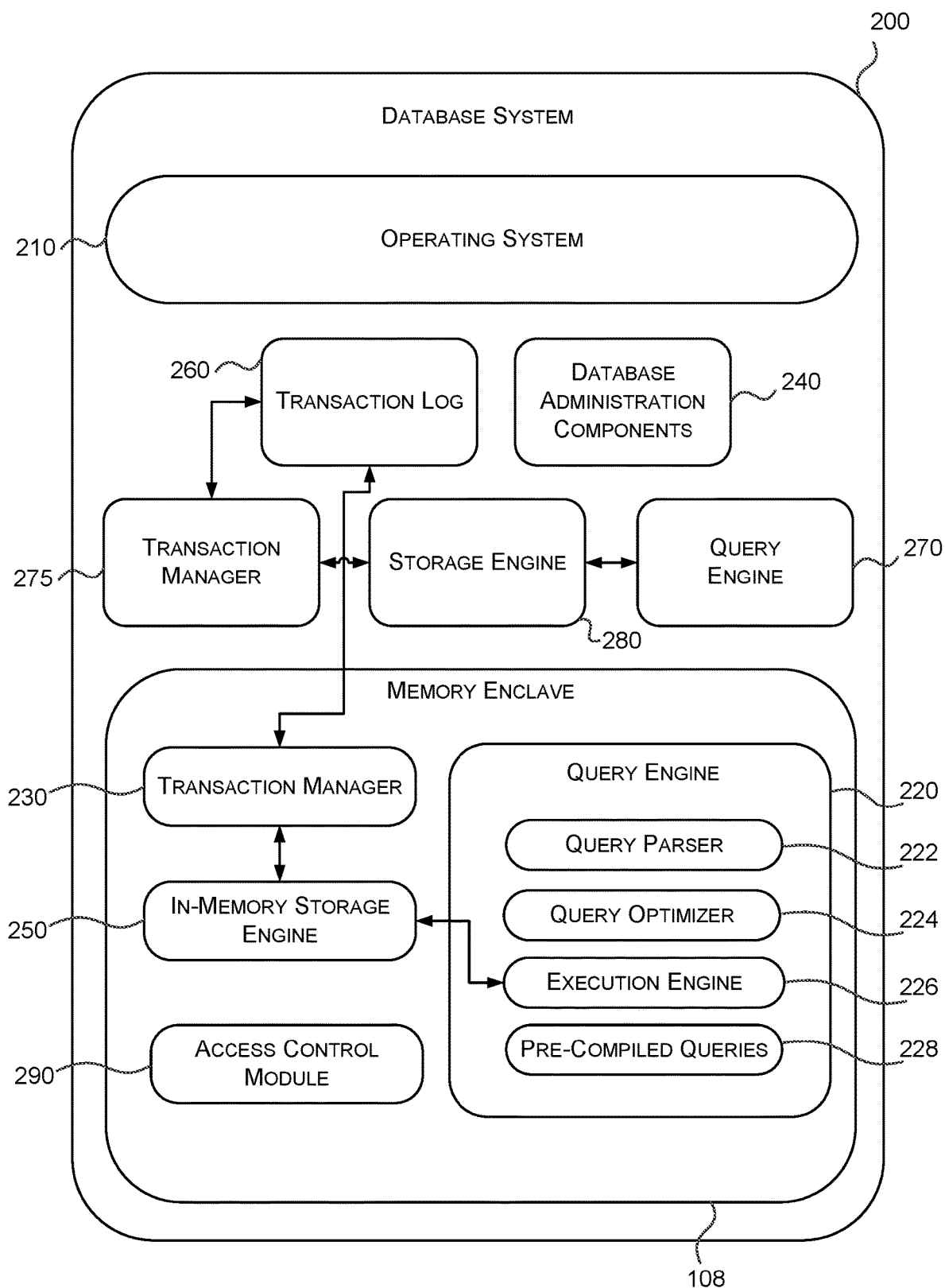
FIG. 2 is a schematic diagram of an exemplary database system which may operate on the computing-based device illustrated in FIG. 1.

FIG. 2 is as schematic diagram of an exemplary database system 200 which may operate on computing device (or host computer system) 100. The database system 200 comprises an operating system 210, a query engine 220, a transaction manager 230 and components which implement database administration functionality (otherwise referred to as database administration components 240). In addition to these components, the exemplary database system 200 illustrated in FIG. 2 further comprises an in-memory storage engine 250, a transaction log 260, a second query engine 270, a second transaction manager 275, a second storage engine 280 and an access control module 290. However, it will be appreciated (as discussed below) that these additional components are optional and may be omitted or replaced by alternative components in other examples. The database system 200 is configured such that the query engine 220 and the transaction manager 230 are executed inside of a memory enclave 108 on the host computer system 100, whilst the operating system 210 and the database administration components 240 are executed outside of the memory enclave 108. By executing these components outside of the memory enclave 108, the processes which provide these components will be unable to view or interfere with any in-memory data belonging to the transaction manager 230 or the query engine. Whilst in the example database system 200 illustrated in FIG. 2, the query engine 220 and the transaction manager 230 are configured to be executed in the memory enclave, in other examples, the query engine 220 and the transaction manager 230 are configured to be executed in separate memory enclaves, with a secure communication channel being established between the memory enclaves to protect the data being communicated between the components in the separate enclaves.

The operating system 210 comprises various functionality which enables the database system 200 to interact with the various hardware of the host computer system 100 on which it is operation. For example, the operating system may provide functionality to enable the database system 200 to interface and store data in non-volatile memory. Any known operating systems 210, including, for example, Microsoft Windows® or Linux, may be used in various examples of database system 200.

The query engine 220 comprises all the components that are necessary to perform a query on the database system 200.

In an example, the query engine 220 comprises a query parser 222, a query optimizer (or planner) 224 and an execution engine 226. The query parser 222 allows the query engine to receive queries that are to be performed on the database system 200 expressed in a high-level query language, such as SQL. The query parser 222 analyses queries expressed in the high-level query language to determine their meaning. The query optimizer (or planner) 224 uses the output from the query parser 222 to determine how the query should be performed on the database system 200. That is to say, the query optimizer 224 determines a set of actions which should be performed on the database system 200 in order to carry out the query. The set of actions that is output from the query optimizer may be referred to as a query plan or a compiled query, as they contain all the detail necessary to carry out a specific query on a specific database system 200 (this specific detail is not included in the query expressed in the query that is expressed in the high-level language that is received by the query parser 222). The execution engine 226 uses the set of actions that is output from the query optimizer 224 to actually perform the query and provide any results. By including the query parser 222 and the query optimizer 224 in the query engine 220, the database system 200 is enabled to process any arbitrary queries expressed in a high-level query language. Furthermore, since the query engine 200 operates inside the memory enclave it is not possible for any other processes on the host computer system 100 to monitor or tamper with the query plan that is generated by the query engine 220 from a query once it has been received in the enclave 108. In some examples, the queries that are received may be encrypted. This helps to ensure their confidentiality and integrity while there are being sent to the query engine 220. In these examples, the query engine authenticates the queries based on their encryption.

In another example, the query engine 220 comprises an execution engine 226 and one or more pre-compiled queries 228. The pre-compiled queries 228 contain the set of actions which should be performed on the database system 200 in order to carry out the query. The pre-compiled queries 228 therefore provide all the detail necessary to carry out a specific query on the database system 200 and are equivalent to the output from the query optimizer 224 in the previous example. However, the pre-compiled queries may be compiled by a user who is the creator of a database on the database system 200 and provided to the host computer system 100 of the database system 200 during creation of the database for inclusion in the query engine 220. This means that the creator of the database can use a query parser and optimizer on a different computer system (which may be more trusted by that user) to compile the queries that are to be included in the query engine 220 when the database is created. When a user wishes to execute a query on the database system 200, the user can indicate to the query engine 220 which of the pre-compiled queries 228 should be executed. The execution engine 226 of the query engine 220 then uses the set of actions detailed by that pre-compiled query 228 to perform the query on the database system 200.

Although the exemplary database system 200 illustrated in FIG. 2 comprises a query parser 222, query optimizer 224, execution engine 226 and pre-compiled queries 228, it will be appreciated that the query engine need not contain all of these components. Indeed, as set out in the preceding examples, the pre-compiled queries 228 may replace query parser 222 and query optimizer 224 in situations where the ability to process arbitrary queries is unnecessary (or where it is desirable to restrict users to a pre-determined set of queries represented by the pre-compiled queries 228). Where the database system 200 comprises all of these components (as illustrated in FIG. 2), an access control module 290 may apply different restrictions to who is able to execute arbitrary queries expressed using a high-level query language and who is able to execute each of the pre-compiled queries.

The transaction manager 230 manages the processing of transactions by the database system 200. A transaction is a set of operations to store data in the database which are to be performed atomically. That is to say, either all of the operations in the set are applied to the database or none of them are. The transaction manger 230 manages the operations of each transaction that is applied to the database to ensure that all of the operations in each transaction are applied to the database, or, where one or more of the operations cannot be applied to the database, to roll-back any of the operations that have been applied to the database. Once of the operations in a transaction have been applied to the database, the transaction manager 230 provides confirmation to the entity that requested the transaction be applied to the database that the transaction has been successfully completed (or committed) to the database.

The components 240 which implement database administration functionality provide the functionality needed by a database administrator to maintain and/or optimize the operation of the database system 200. For example, these components 240 can include components which allow an administrator to take a backup of the database system, troubleshoot problems with the host computer system 100 (or server) and configure storage options (for example, to allocate a different amount of volatile and/or non-volatile memory for a particular database). These administration components 240 do not require access to the actual data in the database. That is to say, they can operate on encrypted forms of the data in the database and do not require the ability to decrypt that data in order to perform their function.

The in-memory storage engine 250 stores data in in-memory tables. The in-memory storage engine 250 also stores data for one or more indexes in-memory. Since the in-memory storage engine 250 executes within the memory enclave 108, the in-memory tables and indexes are also stored within the memory enclave 108. This means that the tables and indexes of the in-memory storage engine 250 are protected from any processes running outside of the memory enclave 108, such as the operating system 210 or database administration components. Therefore, the use of in-memory storage engine 250 provides a suitable way of ensuring the confidentiality and integrity of data in the database system 200 from other processes running on the host computer system whilst enabling the query engine 220 and transaction manager 230 to access the data unhindered.

It will be appreciated that the use of an in-memory storage engine 250 executing within the memory enclave 108 is optional and that other means of storing data may be used instead. For example, a storage engine which stores data directly in non-volatile memory is used in some other examples of the database system 200. Memory enclaves 108 typically do not support direct access to non-volatile memory (which may therefore be referred to as external memory from the perspective of the memory enclave 108). This means that the data stored by such a storage engine will leave the memory enclave 108 and will not be protected from other processes executing on the host computer system 100. To protect the data outside of the memory enclave 108, it can be encrypted prior to leaving the memory enclave 108 and then retrieved in encrypted form and decrypted once it is back inside the protection of the memory enclave 108. In other words, the query engine 220 and transaction manager 230 operating within the memory enclave 108 can interact with such a storage engine to provide encrypted representations of data items to be stored in the external storage and retrieve encrypted representations of individual data items from the external storage which are decrypted inside the memory enclave 108 in order for queries to be performed on the data. This additional encryption and decryption of data incurs additional overhead compared to storing the data in-memory within the enclave.

Where an in-memory storage engine 250 is present within the memory enclave 250 the data stored in the in-memory storage engine 250 will be lost when the host computer system 100 reboots. Such reboots may be caused, for example by the failure of the power-supply to the host computer system 100, the failure of any hardware components of the host computer system 100, or as part of routine maintenance of the host computer system 100. In order to persist the data between such reboots, the in-memory storage engine 250 illustrated in the exemplary database system persists the transactions that are performed on the one or more in-memory tables and/or indexes by writing transaction log entries representing the transactions to a transaction log (or just log) 260 which is stored in non-volatile memory outside of the memory enclave 108. In particular, when the transaction manager 230 completes a transaction with the in-memory storage engine, it may write a log entry for that transaction to the transaction log 260. When the database system 200 is rebooted (that is to say when the host computer system 100 on which the database system 200 is being executed is rebooted), the state of the in-memory tables and/or indexes of the in-memory storage engine 250 can be restored by replaying the transactions represented by the transaction log entries in the transaction log 260.

Since the transaction log 260 stores all of the information from the in-memory storage engine 250 (which is considered to be sensitive or confidential information), it is desirable to protect the confidentiality of the data stored in the transaction log 260. In some examples, this is achieved by encrypting the transaction log entries using a securely stored key. Additionally, since the transaction log 260 is used to restore the state of the in-memory tables and indexes of the in-memory storage 250 following a reboot of the database system 200, it is desirable to protect the integrity of the data that is read from the transaction log (i.e. to prevent transactions from being maliciously or accidentally removed from the transaction log thereby altering the state of the database when it is restored following a reboot of the database system).

An example of the database system 200 which is configured to ensure integrity of the data read from the transaction log is described further below in relation to FIGS. 5-9.

The second query engine 270, second transaction manager 275, and second storage engine 280 store and query data which is considered to be non-sensitive (i.e. non-confidential, non-critical) data. Accordingly, the second query engine 270, second transaction manager 275, second storage engine 280 are stored outside of the memory enclave 108 and do not have access to the data of the query engine 220, transaction manager 230 and in-memory storage engine 250 that are operating inside the memory enclave 108. In this way, the database system 200 may be configured to handle both sensitive data, using the components operating inside the memory enclave 108, and non-sensitive data, using the second storage engine 280, transaction manager 275 and query engine 270 operating outside of the memory enclave 108. However, of course, due to the separation of the query engines, it is not possible to carry out a single query spanning both sensitive and non-sensitive data. In other examples, database system 200 may solely be concerned with the processing of sensitive data and therefore the second query engine 270, second transaction manager 275 and second storage engine 280 may be omitted.

The access control module 290 functions to restrict which queries may be executed by which users. The access control module 290 will be described further below in conjunction with FIGS. 3 and 4.

It will be appreciated that whilst the various components of the database system 200 which have been described above are illustrated and discussed as being separate components, in some examples, some components might be implemented by a single process whilst in other examples, some components might be implemented by multiple processes.

It will further be appreciated that whilst, in the above description, various components are discussed as being separate from or outside of the memory enclave 108, it does not necessarily follow that these components have to be implemented outside of any enclaves. In some examples, some of the components may be implemented in their own (or shared) enclaves separately from the memory enclave 108 which processes the query engine 220 and transaction manager 230.

Figure 3:
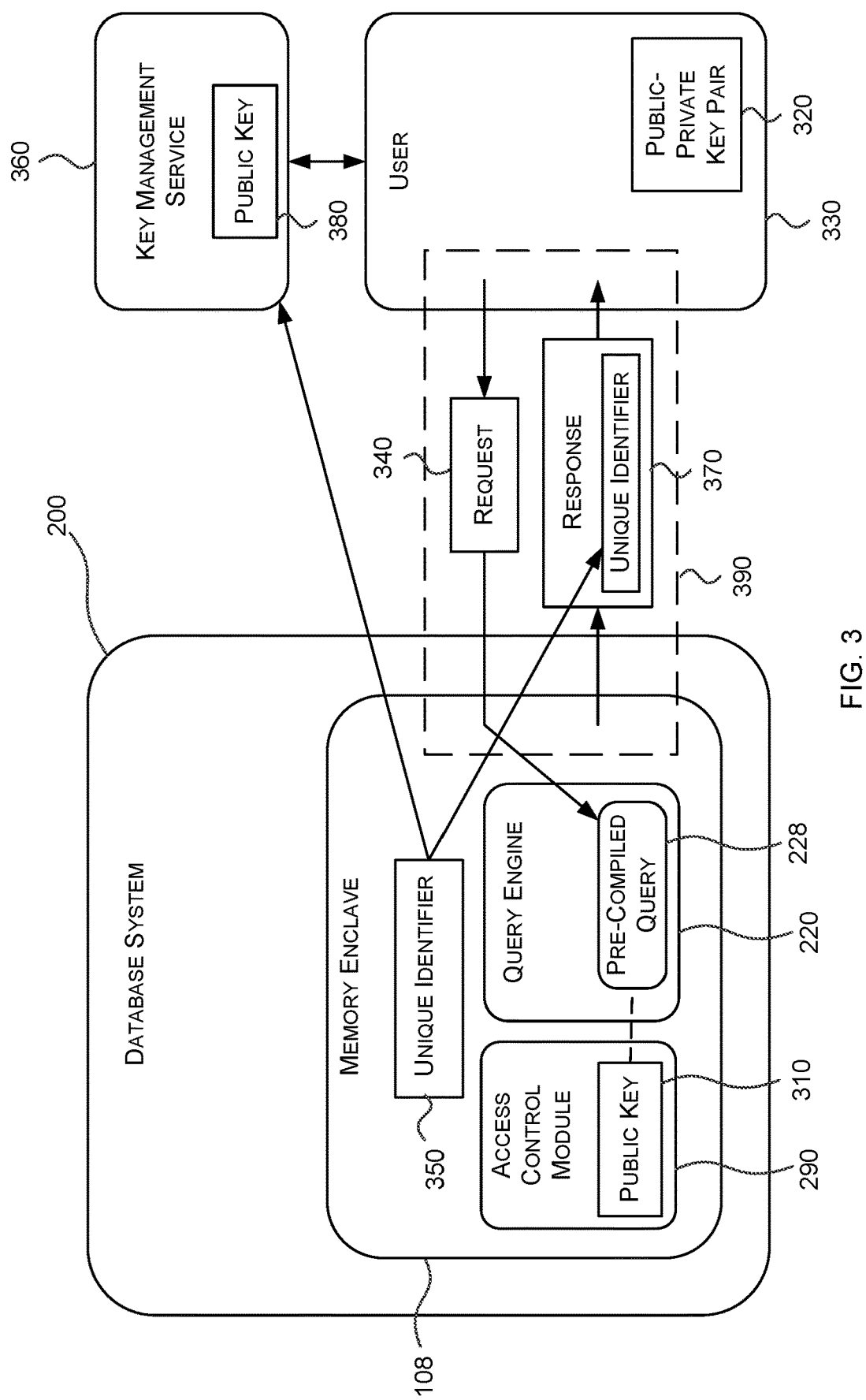
FIG. 3 is a schematic diagram illustrating a user interacting with the database system.
Figure 4:
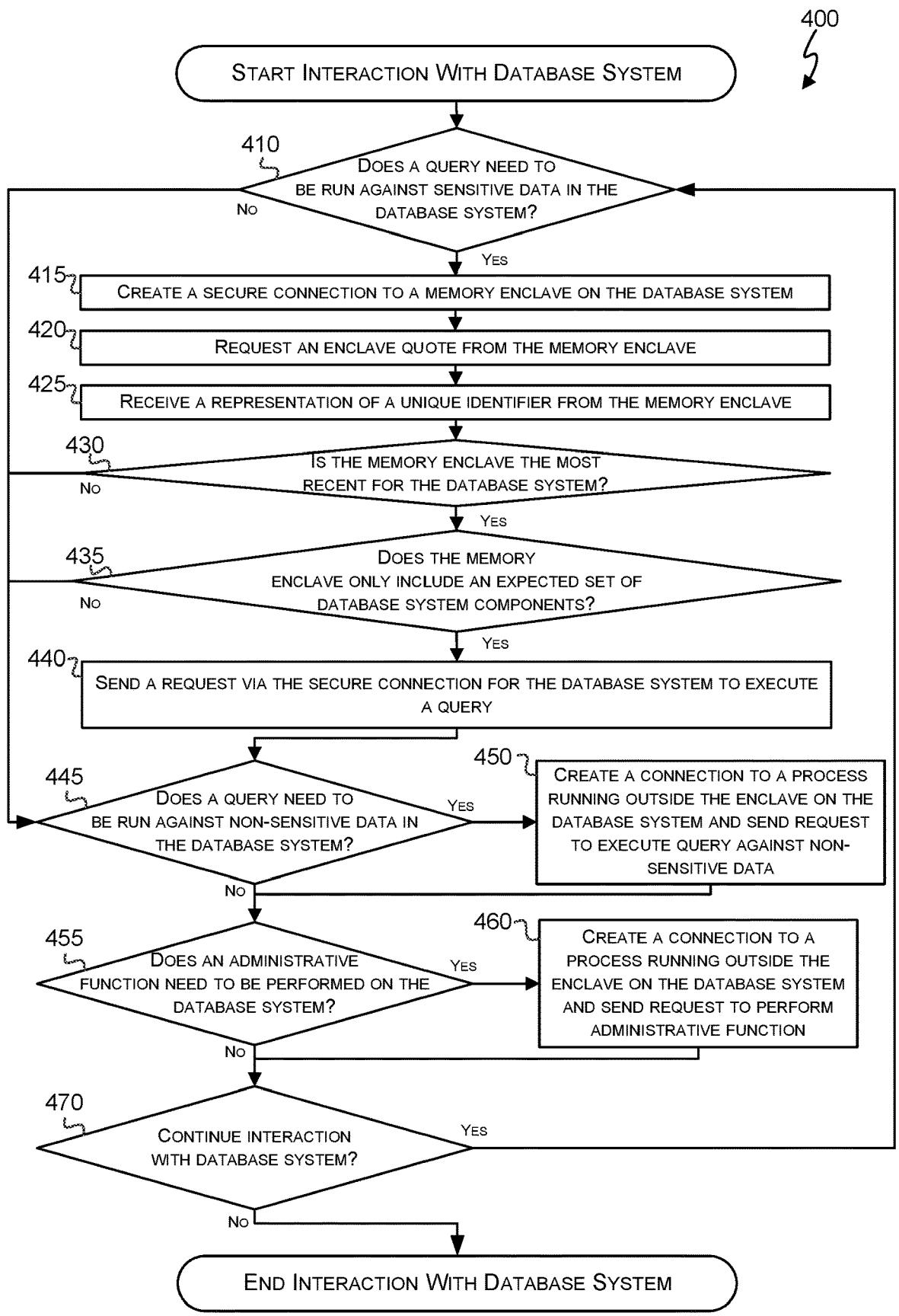
FIG. 4 is a flow diagram of an exemplary method for interacting with the database system.

FIG. 3 is schematic diagram illustrating a user interacting with the database system. This figure will be discussed in more detail below in conjunction with FIG. 4, which is a flow diagram of a method 400 for interacting with the database system 200.

At an operation 410, the method 400 determines that a query needs to be run (or performed or executed) against sensitive data in the database system 200. As will be appreciated from the preceding description, the sensitive data is data for which the confidentiality and/or integrity of the data is important to a user 330 of the database system. If a query needs to be run against sensitive data, the method 400 proceeds to an operation 415. Otherwise, the method 400 proceeds to an optional operation 445.

At operation 415, the method 400 creates a secure connection 390 to the memory enclave 108 of the database system 200. For example, the method 400 may create a TLS connection to the enclave. Once the secure connection 390 has been established, the method 400 proceeds to an operation 420.

At operation 420, the method 400 requests an enclave quote from the memory enclave 108. The quote enables the enclave and its contents to be remotely verified. For example, where the processor 102 supports the use of SGX instructions, which are used to create the memory enclave 108, the quote is an SGX quote. Other technologies which support the creation of memory enclaves provide similar mechanisms for generating an enclave quote for verifying any created enclaves and their contents. Once the enclave quote has been received, the method 400 proceeds to an optional operation 425. In some examples, optional operation 425 is not included in the method 400, in which case, the method 400 proceeds to an operation 435.

At optional operation 425, the method 400 receives a representation of a unique identifier 350 from the memory enclave 108.

In the example illustrated in FIGS. 2 and 3, the database system 200 is configured to generate a unique identifier when the enclave is created. This means that a different unique identifier is created each time an instance of the enclave is started (such as after the database system 200 restarts). In some examples, the unique identifier is a 128-bit GUID. However, other forms of unique identifier can be used instead. The exemplary database system 200 is configured to provide a representation of this unique identifier 350 for the memory enclave 108 to a key management service 360. In some examples, the unique identifier 350 is provided to the key management service 360 as part of an enclave quote requested by the key management service 360 during the provisioning of keys for the enclave. In order to prevent tampering or copying of the representation of the unique identifier 350 that is provided to the key management service 360 may be encrypted using a public key 380 of the key management service 360. The key management service 360 maintains a mapping from the new unique identifiers 350 that it receives to the instances of the memory enclaves 108 that it received them from. By 'new' unique identifier 350, it is meant that the key management service 360 has not previously received that unique identifier 350. Therefore, the key management service 360 will ignore any new instances of the database system which provide a unique identifier 350 which has previously been received by the key management service 360. In essence, the key management service 360 maintains a blacklist of previously received unique identifiers 350 and stores the most recently received (or current) new unique identifier 350. When a new unique identifier 350 is received, the key management service 360 places the previously stored most recently received new unique identifier 350 onto the blacklist and stores the new unique identifier 350 as the most recently received new unique identifier 350.

The database system 200 is also configured to provide a representation of the unique identifier to in any communications with clients. The representation of the unique identifier 350 that is provided to the user 330 may be encrypted using a session key of the secure connection 390. In some examples, the method 400 may receive the unique identifier 350 as part of the enclave quote requested in operation 420. In other examples, the method 400 may receive the unique identifier 350 separately from the enclave quote, such as in response 370 to a request. In any case, once the representation of the unique identifier 350 has been received, the method 400 proceeds to optional operation 430.

At optional operation 430, the method 400 uses the received representation of the unique identifier 350 from the memory enclave 108 to verify that that the memory enclave 108 that the user is communicating with is a most recently created instance of the memory enclave 108. This is achieved by communicating with the key management service 360 to ascertain whether the unique identifier 350 that has been provided by the enclave 108 is the current unique identifier 350 for the database system 200. In some examples, at operation 430, the method 400 provides the unique identifier 350 that was received at operation 425 to the key management service 360 which provides a response indicating whether the instance of the memory enclave 108 is the most current one based on the current unique identifier 350 stored by the key management service 360. In other examples, at operation 430, the method 400 receives the current unique identifier for the database system 200 stored by the key management service 360. The method 400 may then compare the unique identifier 350 that was received from the memory enclave 108 at operation 425 to ascertain whether the memory enclave is the most current one.

Through the optional use of the unique identifier 350 for the memory enclave 108 which is provided to the key management service 360 and in any communication with the user 330, so-called 'forking' attacks can be prevented. A forking attack on the database system 200 would comprise creating multiple instances of the memory enclave 108, each having its own query engine, transaction manager and so on. By directing different requests from users to different instances of the memory enclave 108, the state of the database system 200 could be manipulated. However, where the database system 200 is configured to provide the unique identifier 350, the user 330 is enabled to check that they are communicating with the most recently created instance of the memory enclave 108. This means that only a single instance can be 'active', since users 330 can refuse to communicate with any older instances.

At an operation 435, the method 400 uses the received enclave quote to verify that the processes executing in the memory enclave 108 include an expected set of database system components. That is to say, the user 330 of the database system 200 has at least partial knowledge of the architecture of the database system 200 in advance of using the database system 200. In particular, the user 330 knows that the enclave 108 should contain a query engine 220 and a transaction manager 230, both of which operate in a certain way to protect the confidentiality and integrity of data stored in the database system, in accordance with embodiments of the invention. The user 330 also knows that the enclave 108 should not contain an operating system 210 or database administration components 240. Through the standard enclave quoting mechanism, the user 330 is able to verify that the enclave contains a query engine 220 and a transaction manager 230 and that these components are the expected components which will operate in the expected way to protect the user's data. The user 330 can also verify using the enclave quote that the memory enclave 108 does not contain the operating system 210 or administration components 240. If the user can verify that the memory enclave only includes an expected set of database system components the method 400 proceeds to an operation 440. Otherwise, the method 400 proceeds to optional operation 445.

At operation 440, the method sends a request 340 to the database system 200 via the secure connection 390 to execute a query. In examples where the query engine 220 in the memory enclave 108 of the database system 200 comprises one or more pre-compiled queries, the request 340 comprises an indication of which of the pre-compiled queries should be executed by the database system 200. However, in other examples, the request 340 includes a query specified in a high-level query language, such as SQL to be parsed and compiled by the query parser 222 and query optimizer 224 of the query engine 220.

As mentioned earlier, in some examples, database system 200 may comprise an access control module 290 operating within the memory enclave 108. This access control module 290 controls which requests to execute queries should be accepted by the query engine 220 and which should be refused. The access control module 290 stores one or more public keys 310 within the enclave 108. Each of these public keys 310 belongs to an associated public-private key pair 320 belonging to a user 330 who is authorized to access the database system 200. The access control module 290 uses the public keys 330 to authenticate requests that are received (or issued) by users to the database system to determine whether the user that issued each request is authorized to access the database system 200 using an authentication scheme which requires the user 330 to be in possession of the private key in the public-private key pair 320. Such an authentication scheme could be based on a challenge-response type of authentication scheme or may simply involve the signing of a hash of the request package by the user 330 using their private key. In any case, the access control module uses the stored public keys 310 to determine whether the user is permitted to access the database in accordance with the authentication scheme.

In some examples, where the query engine 220 comprises pre-compiled queries 228, each pre-compiled query 228 may be associated with a group of public keys 290 associated with users that are permitted to execute that pre-compiled query 228. In such examples, the access control module 290 further checks whether the user 320 that issued a request to execute a particular pre-compiled query 228 is authorized to execute that request by confirming, using the authentication scheme, that the user's public key 310 is associated with the pre-compiled query 228 that they are trying to execute (i.e. that user possesses the private key of a public-private key pair 320 which includes a public key 310 contained in the group of public keys 290 associated with the pre-compiled query 228).

The public keys stored by the query engine 220 may be fixed at the time of creation of the database in the database system 200. That is to say, the access control module 290 may not allow additional public keys to be added after the database has been created such that only those users 330 in possession of the private keys of public-private key pairs whose public keys 310 were included in the access control module 290 at the time the database was created may be able to access the database. However, in other examples, the access control module 290 permits requests from authorized users to add a particular public key to allow additional users to execute queries on the database. Similarly, in yet further examples, the access control module 290 permits requests from authorized users to remove a public key from the access control module 290, thereby preventing further execution of queries by the user to which the corresponding public-private key pair 320 belongs.

In some examples, the public-private key pairs 320 may be shared amongst groups of users, such that each user in the group has the private key of the public-private key pair 320 which they can use to authorize their requests to execute queries on the database. For example, a single public key could be provisioned to the access control module during creation of the database and the private key subsequently shared with a group of users to allow those users to access the database. However, in other examples, each user 330 may have their own public-private key pair 320, whereby the private key of the pair 320 is kept secret by the user 330.

Of course, it will be appreciated that the access control module, is an optional component of the database system 200 and need not be present at all, or may be provided by an alternative mechanism, such as, for example, the use of a VPN or a white-list of permitted devices to prevent unauthorized users from accessing the memory enclave 108.

At an optional operation 445, the method 400 determines whether a query needs to be run against non-sensitive data in the database system 200. If so, the method 400 proceeds to an optional operation 450. Otherwise the method 400 proceeds to an optional operation 455. It will be appreciated that, in some examples, the database system 200 may not support storing non-sensitive data outside of the memory enclave 108. In which case, this step may be omitted from the method 400 and the method 400 simply proceeds to optional operation 455.

At optional operation 450, the method creates a connection to a process running outside of the enclave 108 on the database system 200 and sends a request via this connection to execute the query against the non-sensitive data. This request may be received by the database system 200, which may utilize a second query engine 270, second transaction manager 275 and second storage manager 280 to process and respond to the request as normal for database systems. Since the second query engine, transaction manager and storage manager execute outside of the memory enclave, they are unable to access the sensitive data, which requires the operations set out in steps 410, 415,420, 425, 430, 435 and 440 to access.

At an optional operation 455, the method 400 determines whether an administrative function needs to be performed on the database system 200. If so, the method 400 proceeds to an optional operation 460. Otherwise, the method 400 proceeds to an optional operation 470. It will be appreciated that, in some examples, the method 400 for performing administrative functions on the database system 200, as set out in operations 455 and 460 may be performed separately, in isolation, from the method of accessing sensitive data set out in steps 410, 415,420, 425, 430, 435 and 440. In which case, this step may be omitted from the method 400 and the method 400 simply proceeds to optional operation 470.

At an optional operation 460, the method 400 creates a connection to a process running outside of the enclave 108. In some examples, this is the same process that is connected to in order to send a request to execute a query against non-sensitive data in operation 450, the process acting as a gateway to the non-sensitive (or at least less sensitive) components of the database system 200. However, in other examples, this is a different process from that connected to in operation 450. The method 400 sends a request via this connection to perform an administrative function on the database system 200.

At an optional operation 470, the method 400 determines whether the user 330 wishes to continue interacting with the database system 200, in which case the method 400 re-iterates to operation 410, or whether they have finished interacting with the database system 200, in which case the method 400 ends (or terminates). Again, it will be appreciated, that in other examples, optional operation 470 may be omitted such that the method 400 simply ends.

Figure 5:
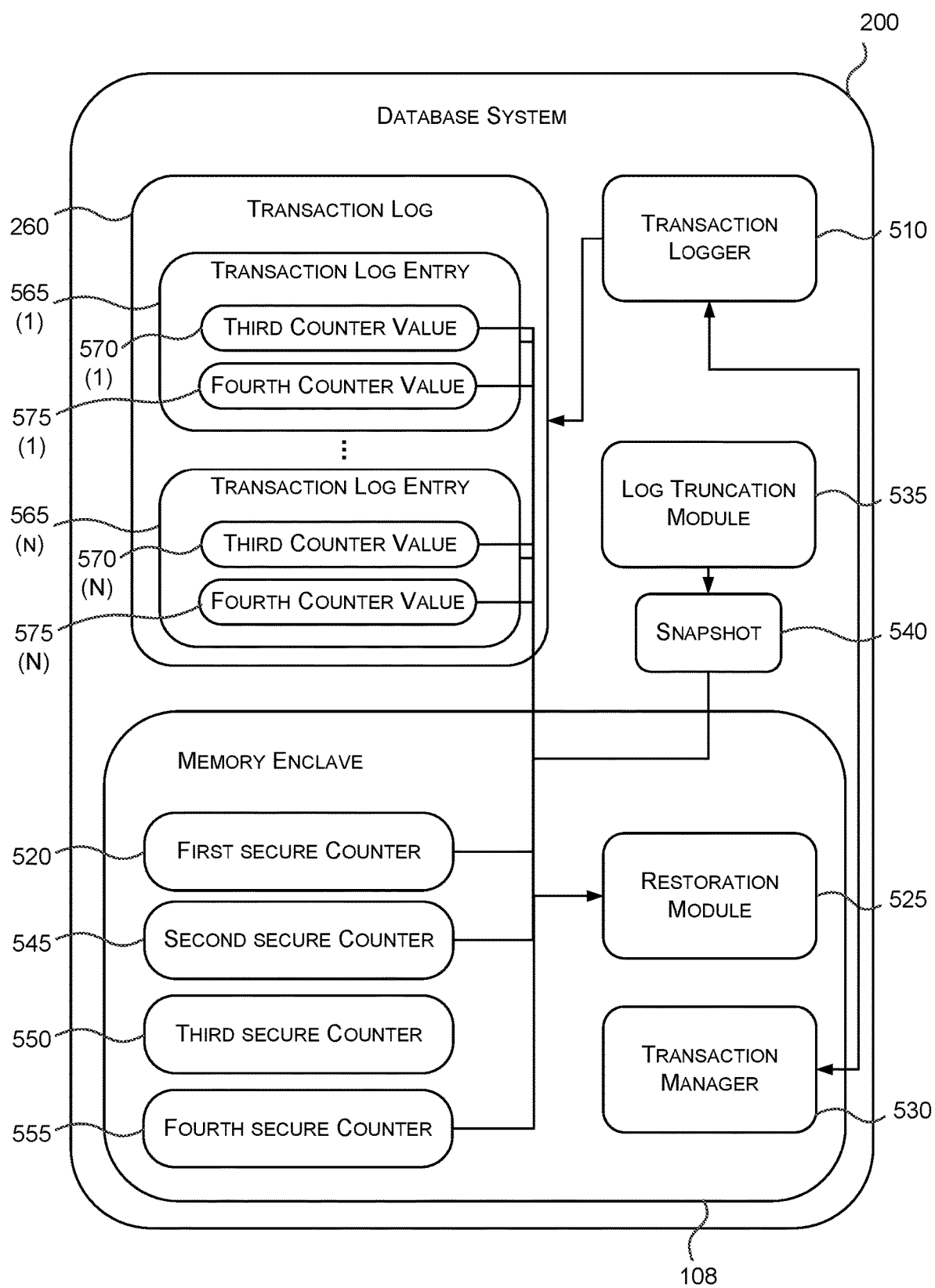
FIG. 5 illustrates another exemplary database which may operate on the computing-based device illustrated in FIG. 1.

FIG. 5 is a schematic diagram of another exemplary database system 200 which may operate on computing device (or host computer system) 100. In addition to the components described above in relation to FIGS. 2-4, the exemplary database system 200 illustrated in FIG. 5 further comprises a transaction logger 510, a first secure counter 520, a restoration module 525. Additionally, the exemplary database system 200 illustrated in FIG. 5 comprises a log truncation module 535, a second secure counter 545, a third secure counter 550 and a fourth secure counter 555 and a transaction manager 530. However, it will be appreciated (as discussed below) that these additional components are optional and may be omitted or replaced by alternative components in other examples. The database system 200 is configured such that at least part of the database system 200 is configured to be executed within a memory enclave 108 (although other forms of trusted execution environment may be used instead). In the example shown in FIG. 5, the database system is configured such that the first, second, third and fourth secure counters, as well as the restoration module 525 and transaction manager 230 are executed inside of the memory enclave 108. However, it will be appreciated that, in other examples, a greater or fewer number of components or different components are executing inside the memory enclave 108 instead. In general, in most examples, the components executing inside the memory enclave 108 allow the database system 200 to guarantee the confidentiality and/or integrity of data that it is operating on, as discussed above in relation to FIGS. 2-4. In some examples, the first, second, third and fourth secure counters are not stored in the same memory enclave, for example, each of the first, second, third and fourth secure counters may be executed in their own separate memory enclaves.

The transaction logger 510 is configured to write transaction log entries 565 to the transaction log 260 which is stored outside of the memory enclave 108. Accordingly, the transaction log 260 contains a plurality of transaction log entries 565. In the example, each new transaction log entry 565 written by the transaction logger 510 is appended to the end of the transaction log. Optionally, in some examples, such as that illustrated in FIG. 2, the transaction log entries 565 include indications of the values of the third and/or fourth secure counters at the time the transaction log entries 565 were written to the transaction log 565.

Since the transaction log 260 is outside of the memory enclave (or trusted execution environment), it is not protected, in terms of confidentiality and/or integrity, by the mechanisms of the memory enclave 108. Accordingly, in some examples, where the confidentiality of the log is important, the transaction log entries may be encrypted using a securely stored encryption key. The encryption key may be stored, for example, sealed within the enclave 108. Meanwhile, the secure counters 520, 545, 550 and 555, together with the indications 570 and 575 of the third and fourth counter values that are stored in each transaction log entry may be used in various examples to provide assurances about the integrity of log entries 565 which are read from the transaction log 560.

In the example illustrated in FIG. 5, the transaction logger 510 is instructed to write entries 565 to the log by the transaction manager 230 which is executing inside of the enclave 108.

As discussed above in relation to FIG. 2, the transaction manager 230 manages the processing of transactions by the database system 200. A transaction is a set of operations to store data in the database which are to be performed atomically. That is to say, either all of the operations in the set are applied to the database or none of them are. The transaction manger 230 manages the operations of each transaction that is applied to the database to ensure that all of the operations in each transaction are applied to the database, or, where one or more of the operations cannot be applied to the database, to roll-back any of the operations that have been applied to the database. Once of the operations in a transaction have been applied to the database, the transaction manager 230 provides confirmation to the entity that requested the transaction be applied to the database that the transaction has been successfully completed (or committed) to the database as part of a commit callback procedure. The storing of a log entry representing a transaction is considered to be part of the operations that are performed in processing the transaction. This is because, until the transaction has been logged in the transaction log 260, the transaction manager 230 cannot guarantee that the data will be available if the database system 200 needs to be restored from the transaction log 260. Therefore, in order to prevent loss of data, the transaction manager 230 (or other component managing the processing of transactions for the database system) does not provide confirmation that the transaction has been committed to the database to the entity that requested the transaction be performed until the transaction logger 510 has confirmed that the transaction log entry 565 for that transaction has been written to the transaction log 560. This is because once an entity receives confirmation that a transaction has been committed, the entity can (and frequently will) discard its copy of the data that was contained in the transaction on the understanding that this data is now safely stored in the database. Because of this way of operating, the transaction log 260 may contain log entries 565 representing transactions which have been committed to the database (i.e. where the transaction manager 230 has provided confirmation that the transaction has been committed to the database to a requesting entity) and those which are not yet committed to the database (i.e. where the transaction manager 230 has not yet provided confirmation that the transaction has been committed to the database to the requesting entry). These transactions which have log entries 565 written in the transaction log 260 but have not yet been considered to be committed to the database may be referred to as non-committed or hidden transactions. Since the requesting entity may attempt to resubmit any non-committed transactions (i.e. transactions where the requesting entity has not yet been provided with confirmation that the transaction has been committed), in some examples (as discussed in more detail below), the database system 200 provides a mechanism to prevent such hidden transaction from being restored to the database system 200 when restoring from the transaction log 260.

The first secure counter 520 is used by the database system 200 to maintain a count representing the number of transaction log entries 565 that have been written to transaction log 260 for which the corresponding transactions have been committed to the database. That is to say, the number of transaction log entries 565 in the transaction log 260 for which confirmation that the corresponding transaction has been committed to the database has been provided to the requesting entity. The use of the first secure counter 520 will be described further below.

When a transaction log becomes too big, some database systems can combine a number of entries in the log together into a snapshot of the database system. Such snapshots completely represent the state of the database at a particular point in time. The database system can then truncate (or remove) the log entries that have been combined into a snapshot from the transaction log since they are no longer needed to restore the database. Instead, the database can be restored using a latest snapshot as a starting point and replaying the remaining transaction log entries from the transaction log. Of course, the database system may still keep copies of the truncated transaction log entries outside of the transaction log if desired (possible, for example, to allow for auditing/review of the transactions that have taken place).

The log truncation module 535 truncates the transaction log 260 by generating a snapshot 540 of the database system 200 at a particular point in time. The snapshot 540 effectively combines all the transaction log entries 565 occurring before the particular point in time at which the snapshot 540 is taken. In some examples, there are two types of snapshot that may be produced—data snapshots which represent the rows that have been inserted or updated since the previous snapshot and delta snapshots which represent rows which have been delete since the previous snapshot. In such examples, the latest snapshot 540 is considered to comprise all previous data and delta snapshots that have been taken up to and including the most recent ones. The database system 200 can then be restored by using the latest snapshot 540 and any transaction log entries 565 for transactions occurring after the snapshot 540 was taken. This means that transaction log entries 565 occurring before the point in time that the snapshot 540 was taken can be removed from the transaction log 560 (or truncated) without affecting the ability for the database system 200 to be restored. The log truncation module 535 operates to ensure that only transaction log entries 565 relating to transactions which have been committed to the database are included in the snapshot 540. Therefore, when truncating the log 260 (and generating a snapshot 540) the log truncation module 535 identifies a point in the transaction log 260 at which all log entries 565 prior to that point relate to transactions which have been committed. In some examples, the log truncation module 535 identifies the latest point in time within the log at which all log entries 565 prior to that point relate to transactions which have been committed. By excluding log entries 565 relating to transactions which have not been committed, the log truncation module 535 can ensure the integrity of the snapshot, even if the database goes offline before all transactions for which log entries 565 have been written to the log 260 have been committed.

In examples where the database system comprises a log truncation module 535 (i.e. in databases where truncation of the transaction log 260 is supported), there is the possibility of reinserting the truncated log entries back into the transaction log 260, thereby effectively causing those transactions to occur twice when the database system 200 is restored from the transaction log 260 (once due to the effect that the transaction had on the snapshot that was generated and once when the transaction log entry 565 is replayed on the snapshot). Therefore, in examples, a technique is provided for preventing this from happening, as discussed in more detail below.

Additionally, when restoring the database it is necessary to ensure that the latest snapshot 540 is used to restore the database system 200. Otherwise, the state of the database following the restoration will be incorrect. In examples, where data and delta snapshots are produced, this comprises checking that all previously taken data and delta snapshots up to and including the most recent ones are used. To ensure that the latest snapshot is provided the database system 200 maintains a cryptographic hash for each data and delta file. The hash is updated as blocks are added to the file. Once all writes to a checkpoint file have completed, the hash is saved in the system table along with the file name. The database system 200 checks the integrity of all checkpoint file pairs read during recovery by comparing the hash of their contents with the hash in the root file. Next, the database system 200 uses a state-continuity protocol based on Ariadne (see R. Strackx and F. Piessens "*Ariadne: A Minimal Approach to State Continuity*", in 25th USENIX Security Symposium (USENIX Security 16). Austin, Tex.: USENIX Association, 2016, pp. 875-892 for more details on this protocol) to save and restore the system table within the root file while guaranteeing integrity, freshness and liveness.

The second secure counter 545 is used by the database system 200 to maintain a count representing the number of transaction log entries 565 which have been truncated by the log truncation module 535. By combining the information provided by the first secure counter 520 and the second secure counter 545, the database system is enabled to determine how may transactions log entries (for committed transactions) should be present in the transaction log. Specifically, the difference between the first counter and the second secure counter 520 represents the number of committed transaction log entries 565 which should be in the transaction log 260. Of course, the second secure counter 545 is omitted in other examples of the database system 200. The function performed by the second secure counter 545 will be described further below.

The third secure counter 550 is used by the database system 200 to represent the number of transaction log entries 565 which have been written to the transaction log 260. In other words, the third secure counter 550 represents the total number of transaction log entries 565 which have been written to the transaction log regardless of whether the associated transactions have been committed to the database. Of course, the third secure counter 550 is omitted in other examples of the database system 200. The function performed by the third secure counter 550 will be described further below.

The fourth secure counter 555, which may be referred to as the epoch counter, is configured to be incremented during restoration of the database system 200 by the restoration module 525 at least when a value of the third secure counter 550 at the time of restoration is greater than a value of the first secure counter 520 at the time of restoration. When the value of the third secure counter 550 is greater than the value of the first secure counter 520 this indicates that hidden (i.e. non-committed) transactions may be present in the transaction log 260. In some examples, when the database is restored, as discussed further below, any hidden transactions included in the transaction log 260 may be ignored. This gives rise to the possibility that those ignored hidden transactions could be re-inserted into the transaction log and be included in a future restore of the database (when the first secure counter has been incremented to a point that its value is greater than the indications 570 of the third secure counter value contained in the previously ignored hidden transactions), thereby affecting the integrity of the database system 200. In some examples, this is prevented through the use of the fourth secure counter 555 and the inclusion in each of the transaction log entries of an indication 570 of the value of the fourth secure counter 555 at the time those log entries 565 are written to the transaction log. Any previously ignored transactions will indicate a value for the fourth secure counter 555 which is less than its current value, allowing them to be detected and ignored in future restores of the database system 200. Of course, the fourth secure counter 555 is omitted in other examples of the database system 200. The function performed by the fourth secure counter 555 will be described further below.

The secure counters, that is to say the first secure counter 520 and, where present, the second secure counter 545, third secure counter 550 and fourth secure counter 555, are all secure in the sense that they are stored in such a way that their values are persisted between reboots of the host computer system 100 on which the database system 200 operates. The secure counters are also secure in the sense that they are difficult for a malicious user of the system to tamper with.

In some examples, the secure counters are monotonic counters. That is to say, they only allow the counter to be incremented, not decremented. This provides an additional barrier to a would be attacker attempting to alter the logs because the secure counter does not provide any function to allow the count to be decremented (as would be required if log entries 565 were to be removed from the log without detection). The insertion of additional new log entries 565 into the transaction log is generally of less concern because existing mechanisms, such as encrypting the log entries 565 or signing a hash of the log entries 565 using a securely stored private key can provide a good level of protection against such attacks.

Where the secure counters are not monotonic, the representations of the different secure counts may be stored relative to the other secure counts. That is to say, instead maintaining an absolute number of transactions as the third secure count, the third secure count could be implicitly provided by summing the value of the first secure count with a counter which explicitly tracks the number hidden (i.e. non-committed) transactions that may also have log entries present in the transaction log 260. The use of a non-monotonic counter in such examples allows the counts to be decremented as well as incremented, enabling this approach to be used. As a further example of this approach, the second secure count could be implicitly provided by maintaining an explicit count of the number of log entries 565 for transactions which have been committed where those log entries have not yet been truncated. In this example, the second secure count is implicitly provided by subtracting the value of this explicit count from the value of the first secure count 240.

In some examples, the secure counters may be provided by features of the trusted execution environment within which parts of the database execute. As an example, a monotonic counter can be implemented using the wear-limited NVRAM available in the management engine. However, in alternative example, the secure counters are provided by distributed monotonic counter service, which will now be described in more detail below in conjunction with FIG. 6. The distributed monotonic counter service is potentially more flexible and efficient than using features of the trusted execution environment since monotonic counters implemented using such features can be slow to access.

Figure 6:
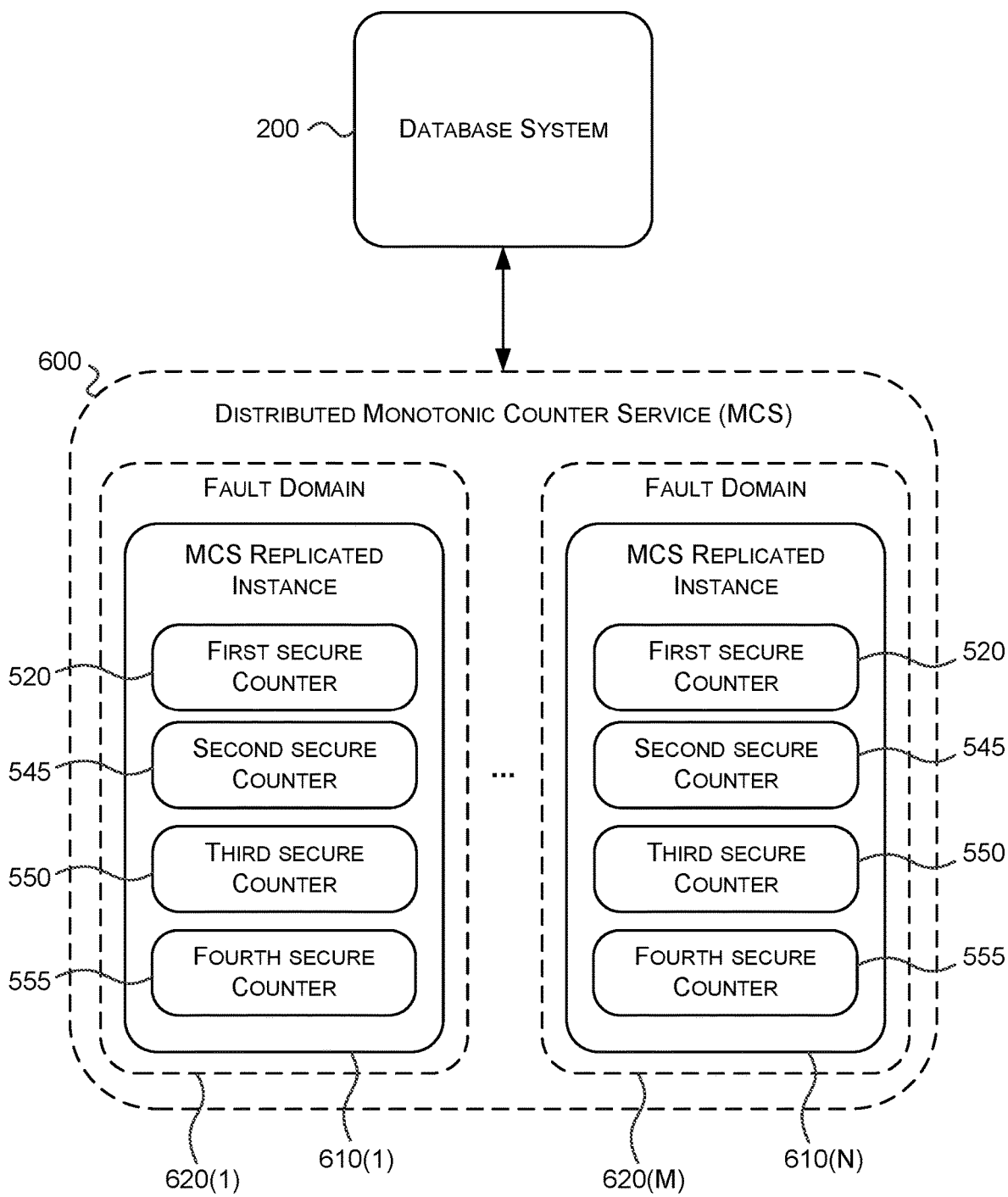
FIG. 6 illustrates an exemplary distributed monotonic counter service (MCS) with which embodiments of the database system may communicate to maintain and retrieve secure counts.

FIG. 6 is a schematic diagram of an exemplary distributed monotonic counter service (MCS) 600 with which examples of the database system 200 may communicate to maintain and retrieve the secure counts 520, 545, 550 and 555. The distributed monotonic counter service (MCS) 600 comprises two or more replicated instances 610 which are distributed across more than one fault domain 620.

A fault domain is defined by the scope with which faults have the potential to impact the provision of computational services. In other words, all services operating within a single fault domain 620 can potentially be made unavailable by a single fault within the hardware providing those services. Whereas, services operating across more than one fault domain 620 cannot be made unavailable by a single fault within the hardware providing those services. In some examples, a fault domain may also encompass all computing services within a particular geographical area which may be impacted by a single event (such as an earthquake or fire) within that geographical area. In such examples, the distribution of the replicated instances 610 of the distributed monotonic counter service 600 across more than one fault domain 620 may require some form of geographical separation between computer systems 100 operating the replicated instances 610 (however, in other examples, this needn't be the case). By distributing the monotonic counter service 600 across multiple fault domains 620, the reliability of the monotonic counter service can be very high and in general, is better the greater number of fault domains 620 the instances 610 are spread across.

Each of the monotonic counter service replicated instances 610 stores their own versions of the count for each of the secure counters. The instances 610 then determine what the current value for each of the secure counters is using a consensus (or agreement) protocol between two or more or all of the replicated instances 610. In some examples, a consensus is reached based on a majority of the replicated instances 610 storing a particular value. In some examples, a consensus may be reached if a particular number or proportion of the replicated instances 610 store a particular value. In such examples, it is not necessary for the values stored by all of the replicated instances 610 to be checked if a certain number of replicated instances 610 are already in agreement. Indeed, where some of the replicated instances 610 are rendered unavailable (for example, due to a fault in the fault domain 610 within which they operate), consensus may be reached based on those replicated instances 610 that are still available.

The use of the monotonic counter service 600 to store (or provide) the secure counters further improves the integrity of the counters. This is because, an attacker seeking to alter the secure counts to allow them to tamper with the entries 565 in the transaction log 260 would have to gain access to a number of the monotonic counter service instances 610 before they are able to affect the values of the counters that are provided from the service 600, greatly increasing the amount of effort required. This is due to the fact that the monotonic counter service 600 determines the current values from the countries based on the consensus between multiple replicated instances 610 or the service 600 meaning that simply altering the secure counter values stored in one of the instances is unlikely to affect the value of that counter which is reported by the monotonic counter service 600.

In some examples, the database system 200 is multi-threaded. That is to say, it includes a plurality of threads (which may be referred to a transaction processing threads) which can process multiple transactions in parallel. In these examples, a separate first counter 520 and, where they are present, separate second and third counters 545 and 550 are maintained for each of the threads (or conceptually, the first, second and third counters may maintain separate counts associated with each of the threads. Each of the transaction processing threads may cause transaction log entries 565 to be written to the transaction log 260 as they independently process different transactions. In these examples, the transaction log entries 565 that are written to the transaction log 260 each include an indication of which of the transaction processing threads caused that transaction log entry 565 to be written (i.e. which transaction processing thread processed the transaction associated with that transaction log entry 565). The transactions for each thread can then be restored using the respective counters for that thread.

Figure 7:
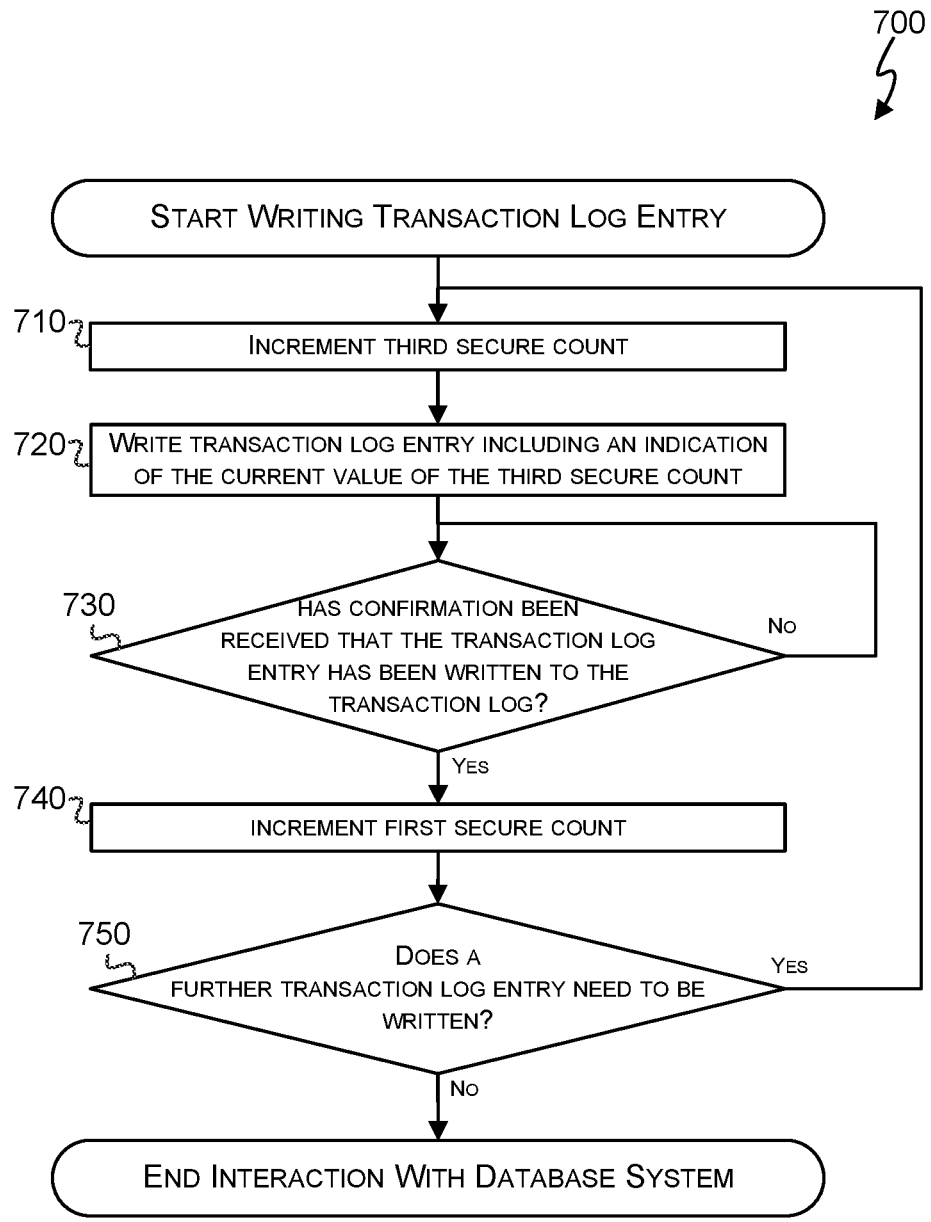
FIG. 7 is a flow diagram of an exemplary method for writing transaction log entries to a transaction log.

FIG. 7 is a flow diagram of an exemplary method 700 for writing transaction log entries 565 to the transaction log 260.

The method 700 starts at an optional operation 710, in which the method 700, increments a value increments the third secure count maintained by the third secure counter 550. This counter represents the number of transaction log entries 565 that have been written to the transaction log 260 (regardless of whether the transactions represented by those log entries have been committed to the database). By incrementing the counter first, the third secure count always reflects the maximum number of log entries 565 that should be retrievable from the transaction log. In some cases, fewer log entries may be retrievable if, for example, the host computer system 100 is rebooted before a transaction log entry 565 is actually written to the transaction log 260. In other examples, the third secure count need not be incremented as a first operation in the method 700, although this may introduce the possibility that the third secure counter 550 does not reflect the maximum number of log entries 565 that should be retrievable from the transaction log 260. Of course, in examples where the database system does not comprise a third secure counter 550 this operation may be omitted in which case the method 700 proceeds directly to an operation 720.

At operation 720, in which the method 700 writes a transaction log entry 565 to the transaction log 260. In the exemplary method 700 illustrated in FIG. 7, the transaction log entry 565 includes an indication 570 of the current value of the third secure counter 550. However, in other examples, where the database system does not include a third secure counter 550, the transaction log does not include this indication 570. In other examples, where the database system maintains the fourth secure counter 555 mentioned above, the transaction log entry 565 further includes an indication of the current value of the fourth secure counter 555. In yet further examples, where the database system 200 comprises a plurality of transaction processing threads, the transaction log entry 565 that is written in operation 720 further includes an indication of which transaction processing thread caused the log entry to be written to the transaction log 260. In some examples, writing the transaction log entry 565 to the transaction log 260 may comprise encrypting the log entry 565 using a securely stored encryption key. In examples, where indications of the third and/or fourth secure counters are included in each of the transaction log entries, these may be included in the log entries 565 as part of the authentication data for the log entries 565 using encrypted authentication. After writing the transaction log entry 565 to the transaction log 260, the method proceeds to an operation 730.

At operation 730, the method 700 waits for confirmation from the transaction log 260 (which may involve waiting for confirmation from the underlying storage abstraction layer and/or hardware) that the transaction log entry has been written to the transaction log 260. In other words, the method 700 waits until the transaction is safely stored such that after this point, it can be guaranteed that the transaction represented by the transaction log entry 565 will be included in any restoration of the database that is performed using the transaction log 260. Once the confirmation that the transaction log entry 565 has been written to the transaction log 260 has been received, the method proceeds to an operation 740.

At operation 740, the method 700 increments the first secure count provided by the first secure counter 520. This operation is performed prior to informing an entity which requested the transaction to be performed that the transaction has been committed as part of the transaction commit callback procedure. Therefore, the first secure count is maintained as a representation of the number of transaction log entries 565 which have been written to the transaction log for transaction which have been committed to the database. After incrementing the first secure count (and completing the transaction commit callback procedure to notify requesting entities that the transaction has been committed), the method 700 proceeds to an optional operation 750.

At optional operation 750, the method 700 determines whether there are any further transaction log entries 565 which need to be written to the transaction log 260, in which case, the method 700 re-iterates back to optional operation 710. Otherwise, the method 700 ends. In some examples, optional operation 750 is omitted such that the method 700 simply ends.

Figure 8:
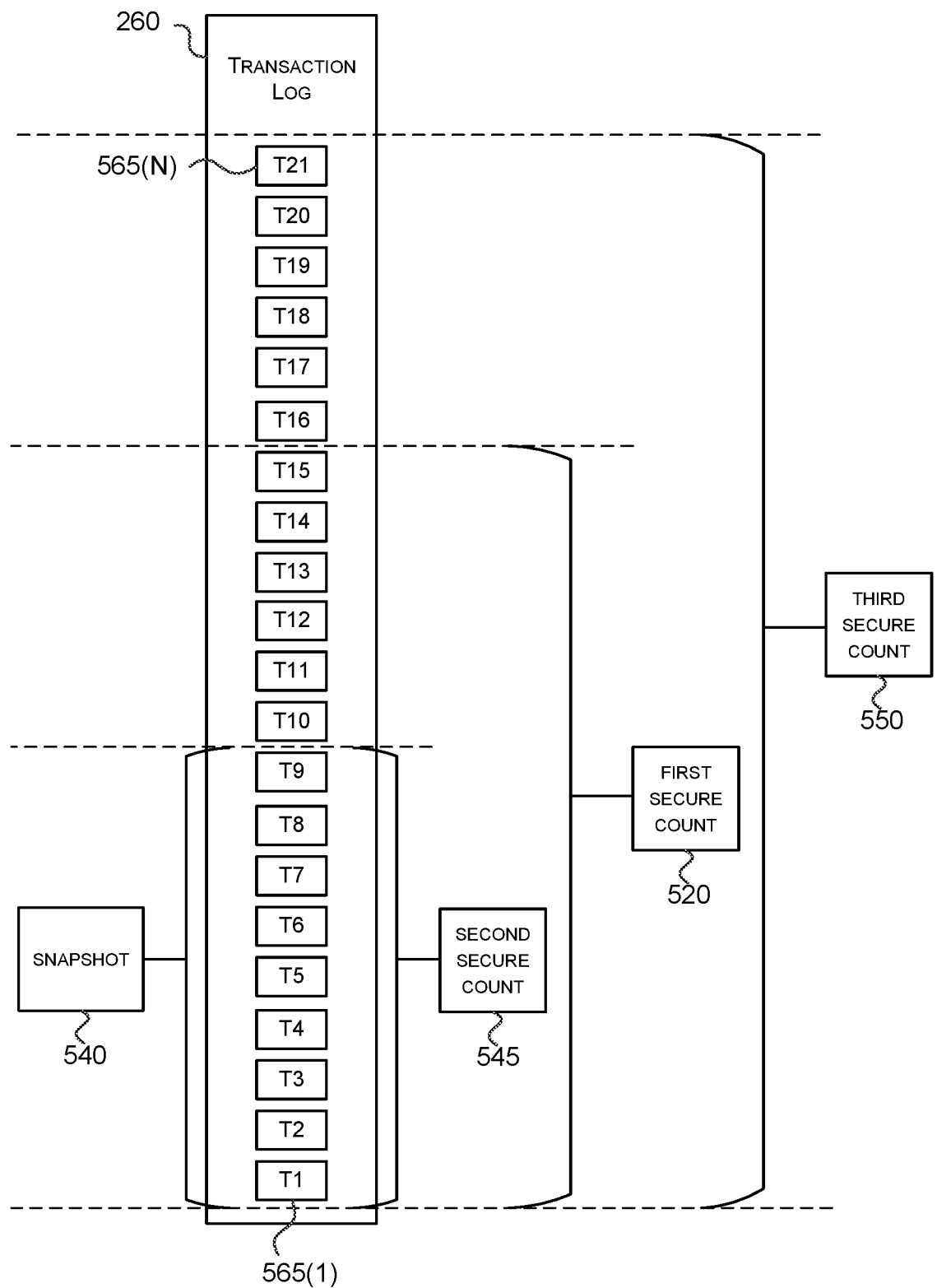
FIG. 8 is a schematic diagram illustrating exemplary relationships between the first, second and third counts and transaction entries within the transaction log.

FIG. 8 is a schematic diagram illustrating exemplary relationships between the first, second and third secure counts 520, 545 and 550 and transaction entries 570 within the transaction log 260. In this illustration, the transaction log 260 comprises twenty one transaction log entries 565 labelled T1 to T21.

In this example, the first nine transaction log entries 565 labelled T1 to T9 have been truncated and combined into a snapshot 540. Therefore, when recovering the database system 200 using this exemplary transaction log 260 illustrated in FIG. 8, the twelve transaction log entries labelled T10 to T21 will be provided (since these have not been truncated from the transaction log), and the database system will need to use the snapshot 540 in conjunction with these transaction log entries 565 to recover the database system 200.

Continuing the example, out of the remaining non-truncated log entries, six log entries, labelled T10 to T15 relate to transactions which have been committed to the database, whilst the remaining six non-truncated log entries, labelled T15 to T20 relate to hidden transactions which have yet to be committed to the database.

Therefore, the value of the first secure count 520 in this example is fifteen, because fifteen transaction log entries 565 have been written to the transaction log 260, nine of which have subsequently been truncated into snapshot 540 and six of which have not been truncated.

In those examples that maintain a second secure count 545, the value of the second secure count in this example is nine, because nine of the transaction log entries 565, labelled T1 to T9, have been truncated into snapshot 540. The total number of non-truncated log entries which relate to transactions that have been committed to the database system 200 is therefore obtainable by subtracting the value of the second secure count 545 from the value of the first secure count 520.

In those examples that maintain a third secure count 550, the value of the third secure count in this example is twenty one because a total of twenty one log entries 565 have been written to the transaction log 260. The total number of log entries 565 relating to hidden (or non-committed) transactions is obtainable by subtracting the value of the first secure count 520 from the value of the third secure count 550.

In examples where the transaction log entries 565 include indications 570 of the third secure counter value 550 at the time that they are written, in this example the log entries T1 to T21 may include indications of the values 1 to 21 respectively. Therefore, the truncated log entries can be identified by finding those log entries indicating a value of the third counter which is less than or equal to the value of the second secure count 545 (where a second secure count is maintained). Similarly, the non-truncated log entries which relate to transactions that have been committed to the database system 200 can be identified by finding those log entries indicating a value of the third counter which is greater than or equal the current value of the second secure count 545 (i.e. greater than nine) and less than or equal to the value of the first secure count (i.e. less than or equal to fifteen). Also, the non-truncated log entries which relate to hidden transactions can be identified by finding those log entries indicating a value of the third counter which is greater than the value of the first secure count 520 (and less than or equal to the value of the third secure count 550).

These relationships between the secure counters and the transaction log entries 565 are used by the database system 200 to verify the integrity of the transaction log entries that are used for recovery of the database system 200 and recover the database system 200 in a manner which preserves its integrity, as will now be discussed in conjunction with FIG. 9.

Figure 9:
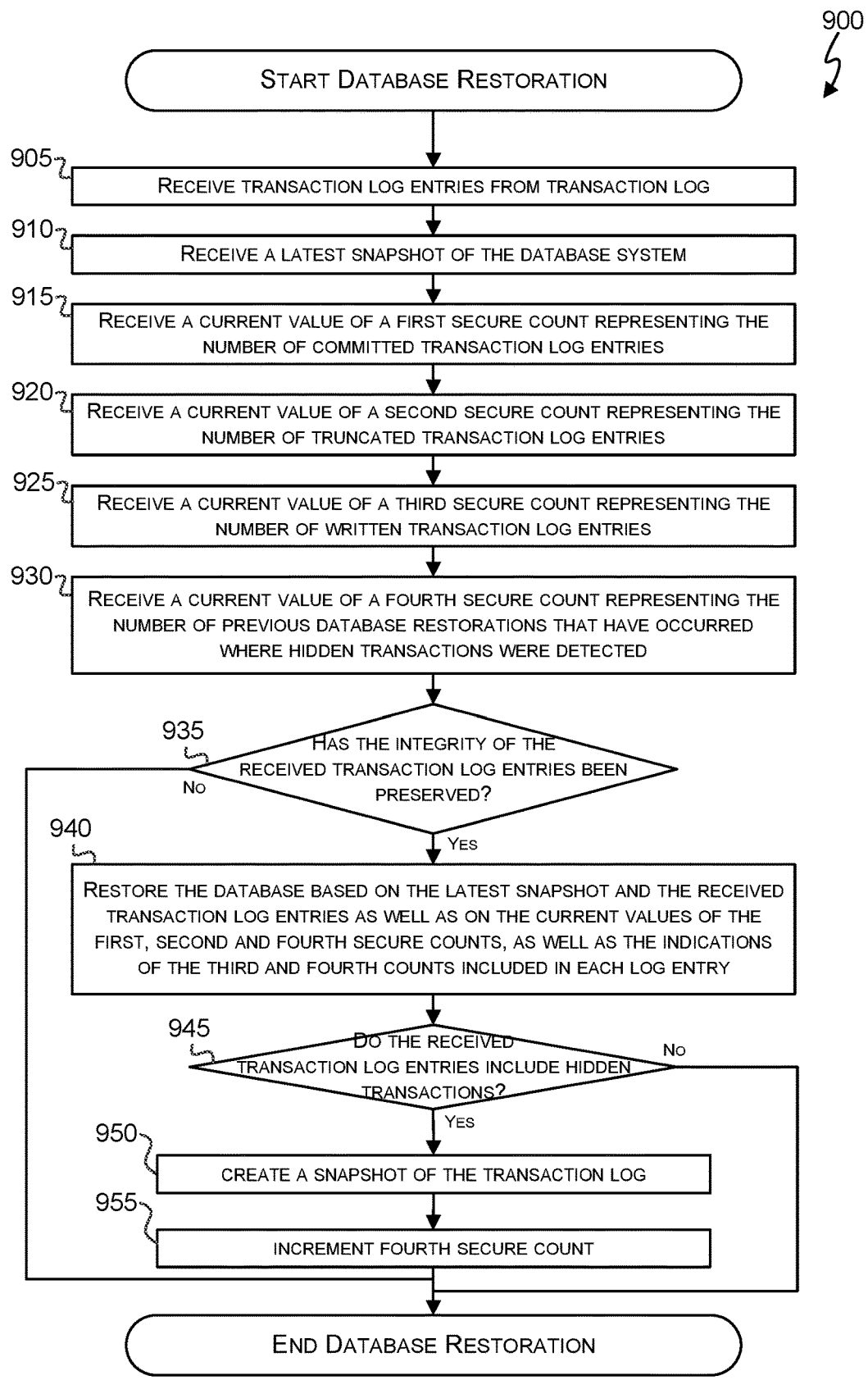
FIG. 9 is a flow diagram of an exemplary method for restoring a database using the transaction log.

FIG. 9 is a flow diagram of an exemplary method 900 for restoring the database system 200 using the transaction log 260.

At an operation 905, the method 900 receives transaction log entries 565 from the transaction log 260. For example, in the illustration provided in FIG. 8, the transaction log entries 565 labelled T10 to T21 would be received. In some examples, the transaction log entries that are received may comprise a respective indication 570 of a value of the third secure counter 550 at the time the transaction log entry 565 was written (where the database system 200 maintains a third secure counter 550), a respective indication 575 of a value of the fourth secure counter 555 (where the database system 200 maintains a fourth secure counter 555) at the time the transaction log entry 565, and/or an indication of a transaction processing thread which processed the transaction to which the log entry 565 relates (where the database system 200 comprises a plurality of transaction processing threads). After receiving the transaction log entries 565, the method 900 proceeds to an optional operation 910.

At optional operation 910, the method 900 receives a latest (or current) snapshot 540. In some examples, the latest snapshot 540 comprises all previous data and delta snapshots that have been taken up to and including the most recent ones. For example, in the illustration provided in FIG. 8, the snapshot 540 representing the state of the database system after the transactions associated with log entries 565 labelled T1 to T9 had been committed would be received. Once the latest snapshot 540 has been received, the method 900 proceeds to an operation 915. Of course, in some examples, optional operation 910 may be omitted, in which case the method proceeds directly to operation 915.

At an operation 915, the method 900 receives a current value of the first secure count 520. In some examples, this may be received from the distributed monotonic counter service 600. For example, in the illustration provided in FIG.

8, the value of fifteen may be received as the current value for the first secure count 520. The method 900 then proceeds to an optional operation 920.

At optional operation 920, the method 900 receives a current value of the second secure count 545. Again, in some examples, this may be received from the distributed monotonic counter service 600. For example, in the illustration provided in FIG. 8, the value nine may be received as the current value for the second secure count 545. The method 900 then proceeds to an optional operation 925. In examples where the database system 200 does not maintain a second secure count 545, this operation may be omitted, in which case the method 900 proceeds to directly to operation 925.

At an operation 925, the method 900 receives a current value of the third secure count 550. Again, in some examples, this may be received from the distributed monotonic counter service 600. For example, in the illustration provided in FIG. 8, the value twenty one may be received as the current value for the third secure count 550. The method 900 then proceeds to an optional operation 930. In examples where the database system 200 does not maintain a third secure count 550, this operation may be omitted, in which case the method 900 proceeds directly to operation 930.

At an operation 930, the method 900 receives a current value of the fourth secure count 555. Again, in some examples, this may be received from the distributed monotonic counter service 600. The method then proceeds to an operation 935. In examples where the database system 200 does not maintain a fourth secure count 255, this operation may be omitted, in which case the method 900 proceeds directly to operation 935.

Whilst the retrieval of the current values of the secure counts is represented in FIG. 9 as four separate operations, it will be appreciated that, in other examples, the values of the secure counts may be retrieved in a single operation. For example, a single request may be made to the distributed monotonic counter service 600 to retrieve all of the secure counts at once. Equally, in other examples, the order in which the secure counts is retrieved may be changed.

At operation 935, the method 900 verifies the integrity of the transaction log 260 based on the secure counts that have been received. In some examples, the operation 935 simply verifies the transaction log 260 by determining that the correct number of transaction log entries 565 have been received.

In examples where only the first secure count 520 is maintained (and snapshotting is not supported), this can be determined by checking that the number of transaction log entries that has been received is at least equal to, if not greater than, the value of the first secure count 520. In the example illustrated in FIG. 8, such examples would verify the integrity of the transaction log if at least fifteen transaction log entries had been received.

In examples where a second secure count 545 is maintained (and snapshotting is supported), this can be determined by checking that the number of log entries that has been received is at least equal to, if not greater than, the value of the second secure count 545 subtracted from the value of the first secure count. In the example illustrated in FIG. 8, such examples would verify the integrity of the transaction log if at least six transaction log entries had been received.

In examples where a third secure count 545 is maintained, this can be determined by checking that the number of log entries that has been received does not exceed the value of the third secure count 545 (or the value of the second secure count 545 subtracted from the value of the third secure count 550 where the second secure count is also maintained). In the example illustrated in FIG. 8 (which supports snapshotting and maintains the second secure count), such examples would verify the integrity of the transaction log if the number of received transaction log entries does not exceed twelve.

In examples where the transaction log entries 565 include indications 570 of the third secure counter value 550 at the time that they are written, this can be determined by checking that the values of those indications are not less than or equal to the value of the second secure count or greater than the value of the third secure count 550. Other such examples also or alternatively check that the indicated 570 third secure counter values 550 form a complete sequence (i.e. that there are no gaps in the sequence of indicated values which would indicate a missing transaction log entry 565). In the example illustrated in FIG. 8, such examples would verify the integrity of the transaction log 260 if the third secure counter values 550 indicated 570 in each transaction log entry 565 do not include any indications less than or equal to nine or greater than twenty one and that the received indications form a complete sequence (i.e. all the values 10, 11, 12, 13, 14, 15, 16, 17, 18, 19, 20 and 21 are indicated by respective transaction log entries).

In examples where a fourth secure count 555 is maintained and the log entries 565 include indications 575 of the value of the fourth secure count 555 at the time that they are written, this can be determined by checking that the values of those indications are not less than (or are equal to) the current value of the fourth secure count 555.

If the integrity of the received transaction log entries 565 is verified, the method 900 proceeds to an operation 940. Otherwise, the method 900 terminates without restoring the database due to the integrity of the transaction log entries 565 being compromised. In other examples, the method 900 may provide a warning to the user that the integrity of the transaction log entries 565 has been compromised. In yet further examples, the method 900 may permit the user to ignore such warnings and restore the database anyway.

At an operation 940, the method 900 restores the database based on the received transaction log entries 565 and, where a snapshot 540 is received, on the received snapshot 540.

In some examples, the restoration is based on received value of the first secure count 520. In some such examples, the database is restored by replaying the transaction log entries 545 until a number of log entries equal to the first secure count 520 has been replayed.

In other examples, where a second secure count 545 is maintained, the restoration is further based on the value of the second secure count 545. In some such examples, the database is restored by replaying the transaction log entries until a number of log entries equal to the second secure count 545 subtracted from the first secure count 520 has been replayed.

In other examples, where indications 570 of a respective third secure count 550 are included in each of the transaction log entries 565, the restoration is further based on the indications 570 contained in each of the transaction log entries 565. In some such examples, the restoration of the database ignores (or excludes) any transaction log entries 565 for hidden transactions, that is transaction log entries 565 where the indication 570 of the third secure count 550 is greater than the current value of the first secure count 520. In other such examples, the restoration of the database ignores (or excludes) transaction log entries which have been truncated, that is, where the indication 570 of the third secure count 550 is less than the current value of the second secure count 545.

In other examples, where the database system 200 maintains a fourth secure counter 555 and the transaction log entries 565 each include an indication 575 of a value of the fourth secure count 555 at the time the transaction log entry was written, the restoration is further based on the current value of the fourth secure counter 555 and the indications 570 contained in each of the transaction log entries 565. In such examples, the restoration of the database ignores (or excludes) any transaction log entries 565 having an indicated 575 fourth secure count 555 value which is less than the current value of the fourth secure count 555.

At optional operation 945, the method 900 determines whether any of the received transaction log entries related to hidden (i.e. non-committed) transactions. This is determined by comparing the value of the third secure count 550 with that of the first secure count 520. If the third secure count 550 was greater than the first secure count 520 then that indicates that log entries relating to hidden transactions may be present in the received transaction log entries 565. If it is determined that the received transaction log entries 565 may include transaction log entries 565 related to hidden transactions, then the method proceeds to optional operation 950. Of course, in some examples, where a fourth secure count 555 is not maintained by the database system 200, operations 945 and 950 may be omitted, in which case the method 900 simply terminates.

At optional operation 950, the method 900 takes a new snapshot of the entire transaction log 260. This ensures that all of the log entries 565 relating to transactions which have been committed to the database are included in the latest snapshot 540. After the snapshot has been created, the method 900 proceeds to an optional operation 955.

At optional operation 955, the method 900 increments the fourth secure count 555. Incrementing the fourth secure count serves to invalidate all previously written transaction log entries 565, including any hidden transaction that might have been present during restoration of the database. This prevents any hidden transactions from being maliciously reused because, in examples in which the database system 200 maintains the fourth secure count, each transaction log entry 565 includes an indication 575 of the value of the fourth secure count 555 at the time the entry 565 is written to the log. Therefore, the database system 200 can ignore all transactions which indicate a value which is less the current value of the fourth secure count 555.

Alternatively or in addition to the other examples described herein, examples include any combination of the following:

A database system comprising an operating system, a query engine, a transaction manager and components implementing database administration functionality, wherein the query engine and the transaction manager are configured to be executed within one or more memory enclaves of a host computer system separately from the operating system and the components implementing database administration functionality.

The database system described above, wherein the query engine comprises a query parser, a query optimizer and an execution engine.

The database system described above, wherein the query engine comprises an execution engine and one or more pre-compiled queries.

The database system described above, wherein the components implementing database administration functionality comprise one or more or all of: a component for taking a backup of the database system; a component for troubleshooting server problems; and a component for configuration of storage options.

The database system described above, further comprising an in-memory storage engine, the in-memory storage engine being configured to be executed within the memory enclave and to read data from and/or write data to one or more tables and/or indexes stored in-memory within the memory enclave.

The database system described above, wherein the in-memory storage engine is configured to persist transactions performed on the one or more tables and/or indexes by writing the transactions to a log stored outside of the memory enclave.

The database system described above, further comprising a second query engine, a second transaction manager and a second storage engine, the second query engine, second transaction manager and second storage engine being configured to be executed outside of the memory enclave, wherein queries for data stored by the in-memory storage engine are processed by the query engine and queries for data stored by the second storage engine are processed by the second storage engine.

The database system described above, further comprising an access control module configured to be executed within the memory enclave and to: store one or more public keys of respective public-private key pairs belonging to users who are authorized to access the database system; and determine whether a user who issued a request to execute a pre-compiled query is authorized to access the database system using an authentication scheme based, at least in part, on the one or more public-private key pairs; refuse the request to execute the pre-compiled query in response to determining that the user who issued the request is not authorized to access the database system.

The database system described above, wherein the access control module stores a single public key of a public-private key pair which is shared between all users who are authorized to access the database system.

The database system described above, wherein the access control module is further configured to associate each of the pre-compiled queries with a respective one or more of the public keys of public-private key pairs belonging to users who are authorized to execute that pre-compiled query, wherein determining whether the user who issued the request is authorized to access the database system comprises determining whether the user who issued the request is authorized to execute that pre-compiled query based, at least in part, on the one or more public keys associated with that pre-compiled query.

The database system described above, wherein the access control module is further configured to receive an indication of a public key which is to be either added to the stored public keys or removed from the stored public keys and to add or remove the indicated public key from the stored public keys accordingly.

The database system described above, wherein the database system is further configured to: generate a unique identifier in response to the memory enclave being created; provide a representation of the unique identifier to a key management service external to the memory enclave; provide a representation of the unique identifier in any communication with clients.

The database system described above, wherein the representation of the unique identifier is generated by encrypting the unique identifier with a public key (380) of the key management service.

A database system comprising: an operating system; an in-memory storage engine; a query engine comprising an execution engine and one or more pre-compiled queries; a transaction manager; an access control module; and components implementing database administration functionality, wherein the in-memory storage engine, the query engine, the transaction manager and the access control module are configured to be executed within a memory enclave of a host computer system separately from the operating system and the components implementing database administration functionality, the in-memory storage engine being configured to read data/from and/or write data to one or more tables and/or indexes stored in-memory within the memory enclave and persist transactions performed on the one or more tables and/or indexes by writing the transactions to a log stored outside of the memory enclave, and the access control module being configured to: store one or more public keys (310) of respective public-private key pairs (320) belonging to users (330) who are authorized to access the database system; and determine whether a user (330) who issued a request (340) to execute a pre-compiled query (228) is authorized to access the database system using an authentication scheme based, at least in part, on the one or more public keys; refuse the request to execute the pre-compiled query in response to determining that the user who issued the request is not authorized to access the database system.

A computer-implemented method for interacting with a database system, the method comprising: creating a secure connection to a memory enclave on the database system; and requesting an enclave quote from the memory enclave; verifying, using the enclave quote, that the processes running in the memory enclave include a query engine and a transaction manager of the database system, but do not include an operating system of the database system or components implementing database administration functionality for the database system; and in response to verifying that the that the processes running in the memory enclave include a query engine and a transaction manager of the database system, but do not include an operating system of the database system or components implementing database administration functionality for the database system, sending a request to the database system via the secure connection to execute a query.

The method described above, wherein the query engine comprises one or more pre-compiled queries and sending a request to the database system via the secure connection to execute a query comprises sending a request comprising an indication of the pre-compiled query to be executed.

The method described above, wherein the verification that is performed using the enclave quote further comprises verifying that the processes running in the memory enclave include an in-memory storage engine configured to be executed within the memory enclave and to read data from and/or write data to one or more tables and/or indexes stored in memory within the memory enclave.

The method described above, wherein the method further comprises: creating a second connection to a process executing outside of the memory enclave on the database system and sending a request to perform one or more administrative functions via the second connection.

The method described above, wherein the method further comprises: creating a second connection to a process executing outside of the memory enclave on the database system and sending a request to execute a second query via the second connection.

The method described above, wherein the method further comprises: receiving, from the memory enclave, a representation of a unique identifier for that memory enclave; communicating with a key management service to determine whether the memory enclave is the most recent instance of the memory enclave to have been created for the database system based, at least in part, on the representation of the unique identifier for the memory enclave.

A database system, such as the database system described above, configured such that at least part of the database system is configured to be executed within a trusted execution environment, the database system comprising: a transaction logger configured to write transaction log entries to a transaction log stored outside of the trusted execution environment, each of the transaction log entries representing a transaction processed by the database system; a first secure counter configured to maintain a representation of the number of transaction log entries which have been written to the transaction log for transactions which have been committed to the database; and a restoration module configured to restore the database system based, at least in part, on transaction log entries retrieved from the transaction log and a current value of the first secure counter.

The database system described above further comprising: a log truncation module configured to truncate the transaction log by generating a snapshot representing the state of the database system at a particular point in time and truncating all transaction log entries for transactions occurring before that point in time; and a second secure counter configured to maintain a representation of the number of transaction log entries which have been truncated by the log truncation module, wherein the restoration module is further configured to restore the database system based additionally on a latest snapshot of the database system and a current value of the second secure counter.

The database system described above further comprising: a third secure counter configured to maintain a representation of the number of transaction log entries which have been written to the transaction log, wherein: each transaction log entry written to the transaction log by the transaction logger comprises a respective indication of the value of the third secure counter at the time that the transaction log entry was written; and the restoration module is further configured to restore the database system based additionally on a latest snapshot and the respective values of the third secure counter indicated by each of the transaction log entries.

The database system described above further comprising: a plurality of transaction processing threads, wherein each of the transaction log entries written to the transaction log comprise a respective indication of the transaction processing thread which processed the transactions represented by that transaction log entry, wherein each of the separate transaction processing threads is associated with a separate respective first, second and third secure counter and the restoration module is further configured to restore the database system based additionally on the indication of the transaction processing thread in each transaction log entry and the respective first, second and third secure counters for each transaction processing thread.

The database system described above further comprising: a fourth secure counter configured to be incremented during restoration of the database system by the restoration module at least when a value of the third secure counter at the time of restoration is greater than a value of the first counter at the time of restoration, wherein: each transaction log entry written to the transaction log by the transaction logger comprises a respective indication of the value of the fourth secure counter at the time that the transaction log entry was written; and the restoration module is further configured to restore the database system based additionally on a current value of the fourth secure counter and the respective values of the fourth secure counter indicated by each of the transaction log entries.

The database system described above, wherein the restoration module is further configured to ignore, during restoration of the database system, one or more or all of: transaction log entries which include an indication of a value for the third secure counter which is less than or equal to the current value of the second secure counter; transaction log entries which include an indication of a value for the third secure counter which is greater than the current value of the first secure counter; transaction log entries which include an indication of a value for the fourth secure counter which is less than the current value of the fourth secure counter.

The database system described above, wherein the restoration module is further configured to verify that the integrity of the received transaction log entries has been preserved, by determining that the values of the third secure counter indicated by each of the transaction log entries forms a complete sequence.

The database system described above, wherein the restoration module is further configured to verify that the integrity of the received transactions has been preserved, by: determining that the number of received transaction log entries is not less than the current value of the first secure counter less the current value of the second counter; and determining that the number of received transaction log entries is not greater than the current value of the third secure counter less the current value of the second counter.

The database system described above, wherein the database system is configured to encrypt each of the transaction log entries using a securely stored encryption key.

The database system described above where the secure counters are monotonic counters.

The database system described above, wherein the monotonic counters are provided by a distributed monotonic counter service, the distributed monotonic counter service comprising two or more replicated instances, the two or more replicated instances being distributed across more than one fault domain, wherein the distributed monotonic counter service is configured to determine a current value of each secure count using a consensus protocol between two or more or all of the replicated instances.

A computer-implemented method for writing transaction log entries to a transaction log for a database system, wherein at least part of the database system is configured to be executed within a trusted execution environment and the transaction log is stored outside of the trusted execution environment, the method comprising: maintaining a first secure count representing a number of transaction log entries which have been written to the transaction log for transactions which have been committed to the database; and writing a transaction log entry to the transaction log.

The method described above, further comprising: maintaining a third secure count representing a number of transaction log entries which have been written to the transaction log, wherein the transaction log entry that is written to the transaction log comprises an indication of a value of the third secure count at the time the transaction log entry is written.

The method described above, wherein the database system comprises a plurality of transaction processing threads and wherein the transaction log entry that is written to the transaction log further comprises an indication of the transaction processing thread which processed the transaction represented by the transaction log entry.

The method described above, wherein the database system maintains a fourth secure count representing a number of times the database has been restored and transaction log entries related to non-committed transactions have been detected and wherein the transaction log entry that is written to the transaction log further comprises an indication of a value of the fourth secure count at the time the transaction log entry is written.

The method described above further comprising encrypting the transaction log entry that is written to the transaction log using a securely stored encryption key.

A computer-implemented method for restoring a database system, wherein at least a part of the database system is configured to be executed within a trusted execution environment, the method comprising: receiving one or more transaction log entries retrieved from a transaction log stored outside of the trusted execution environment, each of the one or more transaction log entries representing a transaction processed by the database system; and receiving a current value of a first secure count maintained by the database system, the first secure count representing the number of transaction log entries which have been written to the transaction log for transactions which have been committed to the database; verifying the integrity of the transaction log based, at least in part, on the current value of the first secure count by determining that a correct number of transaction log entries has been received; and in response to verifying the integrity of the received transaction log entries, restoring the database using the received transaction log entries and the current value of the first secure count.

The method for restoring a database system described above, wherein the database system is configured to truncate the transaction log by generating a snapshot representing the state of the database system at a particular point in time and truncating all transaction log entries for transactions occurring before that point in time, the method further comprising: receiving a latest snapshot of the database system; and receiving a current value of a second secure count maintained by the database system, the second secure count representing the number of transaction log entries which have been truncated, wherein: verifying the integrity of the transaction log entries by determining that a correct number of transaction log entries has been received is further based on the current value of the second secure count; and restoring the database comprises applying the transactions represented by the received transaction log entries to the database state represented by the latest snapshot of the database system.

The method for restoring a database system described above further comprising: receiving a current value of a third secure count maintained by the database system, the third secure count representing the number of transaction log entries which have been written to the transaction log, wherein each of the transaction log entries comprises a respective indication of the value of the third secure count at the time that the transaction log entry was written; wherein: verifying the integrity of the transaction log entries by determining that a correct number of transaction log entries has been received is further based on the current value of the third secure count; verifying the integrity of the transaction log entries further comprises determining that the values of the third secure count indicated in each of the received transaction log entries forms a complete sequence; and restoring the database using the received transaction log entries comprises ignoring any transaction log entries which include an indication of the third secure count which is greater than the current value of the first secure counter and/or less than the current value of the second secure counter.

The method for restoring a database system described above further comprising: receiving a current value of a fourth secure count maintained by the database system, the fourth secure count representing the number of times the database has been restored and transaction log entries related to non-committed transactions have been detected, wherein each of the transaction log entries comprises a respective indication of the value of the third secure count at the time that the transaction log entry was written; wherein: verifying the integrity of the transaction log entries further comprises determining that the values of the fourth secure count indicated in each of the received transaction log entries forms is not less than the current value of the fourth secure count; and/or restoring the database using the received transaction log entries comprises ignoring any transaction log entries which include an indication of the fourth secure count which is greater than the current value of the fourth secure count.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A database system for operation on a host computer system having a memory, the database system comprising:
   an operating system executing to enable the database system to store data in the memory;
   a query engine;
   a transaction logger;
   a restoration module; and
   components executing to implement database administration functionality, wherein the query engine and the restoration module execute within one or more memory enclaves of the host computer system separately from the operating system and the components executing to implement database administration functionality, wherein the transaction logger executes to write transaction log entries to a transaction log stored outside of the memory enclaves, each transaction log entry representing a transaction processed by the database system, wherein a secure counter tracks a number of transaction log entries which have been written to the transaction log for transactions which have been committed, and wherein the restoration module executes to verify that a correct number of transaction log entries have been received from the transaction log using the secure counter.

2. The database system according to claim 1, further comprising an in-memory storage engine, the in-memory storage engine executing within the memory enclaves to read data from and/or write data to one or more tables and/or indexes stored in-memory within the memory enclaves.

3. The database system according to claim 1, wherein the query engine comprises an execution engine and one or more pre-compiled queries.

4. The database system according to claim 3, further comprising an access control module executing within the memory enclaves to:
   store one or more public keys of respective public-private key pairs belonging to users who are authorized to access the database system;
   determine whether a user who issued a request to execute a pre-compiled query is authorized to access the database system using an authentication scheme based, at least in part, on the one or more public-private key pairs; and
   refuse the request to execute the pre-compiled query in response to determining that the user who issued the request is not authorized to access the database system.

5. The database system according to claim 1, wherein the database system further executes to:
   generate a unique identifier in response to one of the memory enclaves being created;
   provide a representation of the unique identifier to a key management service external to the created memory enclave; and
   provide a representation of the unique identifier in any communication with clients.

6. The database system according to claim 1, wherein the secure counter is a first secure counter and a second secure counter tracks a number of transaction log entries which have been truncated, the restoration module executing to verify that the correct number of transaction log entries have been received further based on the second secure counter.

7. The database system according to claim 1, wherein the secure counter is a first secure counter and a third secure counter tracks a number of transaction log entries which have been written to the transaction log, the restoration module executing to verify that the correct number of transaction log entries have been received further based on the third secure counter.

8. The database system according to claim 1, wherein the secure counter is a first secure counter, a second secure counter tracks a number of transaction log entries which have been truncated, and a third secure counter tracks a number of transaction log entries which have been written to the transaction log, the restoration module executing to restore a database using the received transaction log entries including ignoring any transaction log entries which include an indication of a value of the third secure counter that is at least one of greater than a value of the first secure counter or less than a value of the second secure counter.

9. The database system according to claim 1, wherein the secure counter is a first secure counter and a third secure counter tracks a number of transaction log entries which have been written to the transaction log, the restoration module executing to determine whether values of the third secure counter indicated in each of the received transaction log entries form a complete sequence.

10. A database system for operation on a host computer system having a memory, the database system comprising:
    an operating system executing to enable the database system to store data in the memory;
    a transaction logger;
    a restoration module; and
    components executing to implement database administration functionality, wherein the restoration module is execute within a memory enclave of the host computer system separately from the operating system and the components executing to implement database administration functionality, wherein the transaction logger is configured to write transaction log entries to a transaction log stored outside of the memory enclave, each transaction log entry representing a transaction processed by the database system, wherein a secure counter tracks a number of transaction log entries which have been written to the transaction log for transactions which have been committed, and
    wherein the restoration module executes to verify that a correct number of transaction log entries have been received from the transaction log using the secure counter.

11. The database system according to claim 10, wherein the secure counter is a first secure counter and a second secure counter tracks a number of transaction log entries which have been truncated, the restoration module executing to verify that the correct number of transaction log entries have been received further based on the second secure counter.

12. The database system according to claim 10, wherein the secure counter is a first secure counter and a third secure counter tracks a number of transaction log entries which have been written to the transaction log, the restoration module executing to verify that the correct number of transaction log entries have been received further based on the third secure counter.

13. The database system according to claim 10, wherein the secure counter is a first secure counter, a second secure counter tracks a number of transaction log entries which have been truncated, and a third secure counter tracks a number of transaction log entries which have been written to the transaction log, the restoration module executing to restore a database using the received transaction log entries including ignoring any transaction log entries which include an indication of a value of the third secure counter that is at least one of greater than a value of the first secure counter or less than a value of the second secure counter.

14. The database system according to claim 10, wherein the secure counter is a first secure counter and a third secure counter tracks a number of transaction log entries which have been written to the transaction log, the restoration module executing to determine whether values of the third secure counter indicated in each of the received transaction log entries form a complete sequence.

15. A computer-implemented method for interacting with a database system, the method comprising:
    creating a secure connection to a memory enclave on the database system; and
    requesting an enclave quote from the memory enclave;
    verifying, using the enclave quote, that processes running in the memory enclave include a query engine and a transaction manager of the database system, but do not include an operating system of the database system or components executing to implement database administration functionality for the database system;
    in response to verifying that the processes running in the memory enclave include a query engine and a transaction manager of the database system, but do not include an operating system of the database system or components executing to implement database administration functionality for the database system, sending a request to the database system via the secure connection to execute a query;

writing transaction log entries to a transaction log stored outside of the memory enclave, each transaction log entry representing a transaction processed by the database system;

tracking, using a secure counter, a number of transaction log entries which have been written to the transaction log for transactions which have been committed; and verifying that a correct number of transaction log entries have been received from the transaction log using the secure counter.

16. The method according to claim 15, wherein the method further comprises:

receiving, from the memory enclave, a representation of a unique identifier for that memory enclave; and communicating with a key management service to determine whether the memory enclave is a most recent instance of the memory enclave to have been created for the database system based, at least in part, on the representation of the unique identifier for the memory enclave.

17. The method according to claim 15, wherein the secure counter is a first secure counter, the method further comprising tracking, using a second secure counter, a number of transaction log entries which have been truncated, wherein verifying that the correct number of transaction log entries have been received is further based on the second secure counter.

18. The method according to claim 15, wherein the secure counter is a first secure counter, the method further comprising tracking, using a third secure counter, a number of transaction log entries which have been written to the transaction log, wherein verifying that the correct number of transaction log entries have been received is further based on the third secure counter.

19. The method according to claim 15, wherein the secure counter is a first secure counter, the method further comprising:

tracking, using a second secure counter, a number of transaction log entries which have been truncated;

tracking, using a third secure counter, a number of transaction log entries which have been written to the transaction log; and restoring a database using the received transaction log entries including ignoring any transaction log entries which include an indication of a value of the third secure counter that is at least one of greater than a value of the first secure counter or less than a value of the second secure counter.

20. The method according to claim 15, wherein the secure counter is a first secure counter, the method further comprising:

tracking, using a third secure counter, a number of transaction log entries which have been written to the transaction log; and determining whether values of the third secure counter indicated in each of the received transaction log entries form a complete sequence.

* * * * *